United States Patent [19]

Kurokawa

[11] Patent Number: 5,625,467
[45] Date of Patent: Apr. 29, 1997

[54] FACSIMILE APPARATUS FOR PRODUCING AN IMAGE BY USING A NEWLY STORED FONT PATTERN

[75] Inventor: Shunji Kurokawa, Zama, Japan

[73] Assignee: Ricoh Company, Ltd., Tokyo, Japan

[21] Appl. No.: 401,125

[22] Filed: Mar. 9, 1995

Related U.S. Application Data

[63] Continuation of Ser. No. 113,740, Aug. 30, 1993, abandoned.

[30] Foreign Application Priority Data

Aug. 31, 1992 [JP] Japan ................................ 4-232180
Aug. 31, 1992 [JP] Japan ................................ 4-232181
Jul. 23, 1993 [JP] Japan ................................ 5-183004

[51] Int. Cl.$^6$ ........................... H04N 1/40; G06F 15/00
[52] U.S. Cl. ........................ 358/470; 358/401; 395/768; 395/167
[58] Field of Search ............................ 358/470, 467, 358/462, 472, 400, 401, 296; 395/148, 149, 150, 151, 104, 110; H04N 1/40; G06F 15/00

[56] References Cited

U.S. PATENT DOCUMENTS

| 4,196,450 | 4/1980 | Miller et al. ............................. 358/256 |
| 4,539,653 | 9/1985 | Barlett et al. ............................ 395/148 |
| 4,594,674 | 6/1986 | Boulia et al. ............................ 395/150 |
| 4,745,561 | 5/1988 | Hirosawa et al. ........................ 364/523 |
| 4,811,111 | 3/1989 | Kurokawa . |
| 4,819,063 | 4/1989 | Sugiura et al. .......................... 358/470 |
| 4,864,606 | 9/1989 | Kurokawa . |
| 4,907,255 | 3/1990 | Kurokawa . |
| 5,060,980 | 10/1991 | Johnson et al. ............................ 283/70 |
| 5,133,026 | 7/1992 | Fujiwara et al. ........................ 358/470 |
| 5,282,062 | 1/1994 | Ohara et al. ............................. 358/470 |
| 5,490,243 | 2/1996 | Millman et al. ........................ 395/148 |

FOREIGN PATENT DOCUMENTS

1-283156  11/1989  Japan ................................ 395/149

*Primary Examiner*—Edward L. Coles, Sr.
*Assistant Examiner*—Madeleine Anh-Vinh Nguyen
*Attorney, Agent, or Firm*—Oblon, Spivak, McClelland, Maier & Neustadt, P.C.

[57] ABSTRACT

A facsimile apparatus includes a reading part for optically reading font pattern data by raster scanning of a font pattern sheet, a communication part for receiving image data from an external facsimile terminal via a telephone line and for transmitting image data read from a document to an external facsimile terminal via the telephone line, a memory part for temporarily storing image data received or transmitted by the communication part, a printing part for printing an image on a recording sheet in accordance with the image data stored in the memory part, a converting part for converting the font pattern data read by the reading part into bi-level image signals, and for supplying this font data to the memory part, a storage part for storing the font data produced by the converting part, and a control part for reading the font data from the storage part and for allowing the printing part to print an image by using the font data read from the storage part, so that the printed image includes data represented by the font pattern.

13 Claims, 28 Drawing Sheets

FIG. 6

|      | b7 | b6 | b5 | b4 | b3 | b2 | b1 | b0 |
|------|----|----|----|----|----|----|----|----|
| 8000 | 0  | 0  | 0  | 0  | 0  | 0  | 1  | 1  |
| 1    | 0  | 0  | 0  | 0  | 0  | 0  | 0  | 0  |
| 2    | 0  | 0  | 0  | 0  | 0  | 0  | 0  | 0  |
| 3    | 0  | 0  | 0  | 0  | 0  | 0  | 0  | 0  |
| 4    | 0  | 0  | 0  | 0  | 0  | 0  | 0  | 0  |
| 5    | 0  | 0  | 0  | 0  | 0  | 0  | 0  | 0  |
| 6    | 0  | 0  | 0  | 0  | 0  | 0  | 0  | 0  |
| 7    | 0  | 0  | 0  | 0  | 1  | 0  | 0  | 0  |
| 8    | 0  | 0  | 0  | 1  | 0  | 1  | 0  | 0  |
| 9    | 0  | 0  | 1  | 0  | 0  | 0  | 1  | 0  |
| A    | 0  | 0  | 1  | 0  | 0  | 0  | 1  | 0  |
| B    | 0  | 0  | 1  | 1  | 1  | 1  | 1  | 0  |
| C    | 0  | 0  | 1  | 0  | 0  | 0  | 1  | 0  |
| D    | 0  | 0  | 1  | 0  | 0  | 0  | 1  | 0  |
| E    | 0  | 0  | 0  | 0  | 0  | 0  | 0  | 0  |
| F    | 0  | 0  | 1  | 1  | 1  | 1  | 0  | 0  |
| 10   | 0  | 0  | 1  | 0  | 0  | 0  | 1  | 0  |
| 11   | 0  | 0  | 1  | 0  | 0  | 0  | 1  | 0  |
| 12   | 0  | 0  | 1  | 1  | 1  | 1  | 0  | 0  |
| 13   | 0  | 0  | 1  | 0  | 0  | 0  | 1  | 0  |
| 14   | 0  | 0  | 1  | 0  | 0  | 0  | 1  | 0  |
| 15   | 0  | 0  | 1  | 1  | 1  | 1  | 0  | 0  |
| 16   | 0  | 0  | 0  | 0  | 0  | 0  | 0  | 0  |
| 17   | 0  | 0  | 0  | 0  | 0  | 0  | 0  | 0  |
| 18   | 0  | 0  | 0  | 0  | 0  | 0  | 0  | 0  |
| 19   | 0  | 0  | 0  | 0  | 0  | 0  | 0  | 0  |
| 20   | 0  | 0  | 0  | 0  | 0  | 0  | 0  | 0  |

FIG. 7

| | b7 | b6 | b5 | b4 | b3 | b2 | b1 | b0 |
|---|---|---|---|---|---|---|---|---|
| 9000 | 0 | 0 | 0 | 0 | 0 | 0 | 0 | 1 |
| 1 | 0 | 0 | 0 | 0 | 0 | 0 | 0 | 0 |
| 2 | 0 | 0 | 0 | 1 | 1 | 1 | 1 | 1 |
| 3 | 0 | 0 | 0 | 0 | 0 | 0 | 0 | 0 |
| 4 | 0 | 0 | 1 | 1 | 1 | 1 | 1 | 0 |
| 5 | 0 | 0 | 1 | 0 | 0 | 0 | 0 | 0 |
| 6 | 0 | 0 | 1 | 0 | 0 | 0 | 0 | 0 |
| 7 | 0 | 0 | 1 | 1 | 1 | 1 | 1 | 0 |
| 8 | 0 | 0 | 1 | 0 | 0 | 0 | 0 | 0 |
| 9 | 0 | 0 | 1 | 0 | 0 | 0 | 0 | 0 |
| A | 0 | 0 | 1 | 1 | 1 | 1 | 1 | 0 |
| B | 0 | 0 | 0 | 0 | 0 | 0 | 0 | 0 |
| C | 0 | 0 | 1 | 1 | 1 | 1 | 0 | 0 |
| D | 0 | 0 | 1 | 0 | 0 | 0 | 1 | 0 |
| E | 0 | 0 | 1 | 0 | 0 | 0 | 1 | 0 |
| F | 0 | 0 | 1 | 1 | 1 | 1 | 0 | 0 |
| 10 | 0 | 0 | 1 | 0 | 0 | 0 | 1 | 0 |
| 11 | 0 | 0 | 1 | 0 | 0 | 0 | 1 | 0 |
| 12 | 0 | 0 | 1 | 0 | 0 | 0 | 1 | 0 |
| 13 | 0 | 0 | 0 | 0 | 0 | 0 | 0 | 0 |
| 14 | 0 | 0 | 1 | 1 | 1 | 1 | 0 | 0 |
| 15 | 0 | 0 | 1 | 0 | 0 | 0 | 1 | 0 |
| 16 | 0 | 0 | 1 | 0 | 0 | 0 | 1 | 0 |
| 17 | 0 | 0 | 1 | 1 | 1 | 1 | 0 | 0 |
| 18 | 0 | 0 | 1 | 0 | 0 | 0 | 1 | 0 |
| 19 | 0 | 0 | 1 | 0 | 0 | 0 | 1 | 0 |
| 20 | 0 | 0 | 1 | 0 | 0 | 0 | 1 | 0 |

FIG. 12

```
                        ERROR REPORT
                 * * * * * * * * * * *
                     ABC CORP. TOKYO         ('92-03-25 15:30)
************************************************
*                                                              *
*  DATE   START   RECEIVING   MODE   TIME    RESULT   PAGE   FILE  *
*         TIME    STATION            REQ'D                   NO.   *
*                                                              *
*                                                              *
*  03-25  15:30   ABC OSAKA   G3ST   00'32"   E        01          *
*                                                              *
*                                                              *
*                                                              *
*                                                              *
*                                                              *
* ERROR MESSAGE                                                *
*     TRANSMISSION FAILED.                                     *
*     RETRANSMISSION IS REQUIRED.                              *
*     PAGES NOT TRANSMITTED: P-01                              *
*                                                              *
*                                                              *
*                                                              *
************************************************
```

FIG. 15

| | b7 | b6 | b5 | b4 | b3 | b2 | b1 | b0 |
|---:|---|---|---|---|---|---|---|---|
| 8000 | 0 | 0 | 0 | 0 | 0 | 0 | 0 | 1 |
| 1 | 0 | 0 | 0 | 0 | 0 | 0 | 0 | 0 |
| 2 | 0 | 0 | 0 | 0 | 0 | 0 | 0 | 0 |
| 3 | 0 | 0 | 1 | 1 | 1 | 1 | 1 | 0 |
| 4 | 0 | 0 | 1 | 0 | 0 | 0 | 0 | 0 |
| 5 | 0 | 0 | 1 | 0 | 0 | 0 | 0 | 0 |
| 6 | 0 | 0 | 1 | 1 | 1 | 1 | 1 | 0 |
| 7 | 0 | 0 | 1 | 0 | 0 | 0 | 0 | 0 |
| 8 | 0 | 0 | 1 | 0 | 0 | 0 | 0 | 0 |
| 9 | 0 | 0 | 1 | 1 | 1 | 1 | 1 | 0 |
| A | 0 | 0 | 0 | 0 | 0 | 0 | 0 | 0 |
| B | 0 | 0 | 1 | 1 | 1 | 1 | 0 | 0 |
| C | 0 | 0 | 1 | 0 | 0 | 0 | 1 | 0 |
| D | 0 | 0 | 1 | 0 | 0 | 0 | 1 | 0 |
| E | 0 | 0 | 1 | 1 | 1 | 1 | 0 | 0 |
| F | 0 | 0 | 1 | 0 | 0 | 0 | 1 | 0 |
| 10 | 0 | 0 | 1 | 0 | 0 | 0 | 1 | 0 |
| 11 | 0 | 0 | 1 | 0 | 0 | 0 | 1 | 0 |
| 12 | 0 | 0 | 0 | 0 | 0 | 0 | 0 | 0 |
| 13 | 0 | 0 | 1 | 1 | 1 | 1 | 0 | 0 |
| 14 | 0 | 0 | 1 | 0 | 0 | 0 | 1 | 0 |
| 15 | 0 | 0 | 1 | 0 | 0 | 0 | 1 | 0 |
| 16 | 0 | 0 | 1 | 1 | 1 | 1 | 0 | 0 |
| 17 | 0 | 0 | 1 | 0 | 0 | 0 | 1 | 0 |
| 18 | 0 | 0 | 1 | 0 | 0 | 0 | 1 | 0 |
| 19 | 0 | 0 | 1 | 0 | 0 | 0 | 1 | 0 |

FIG. 22

| | b7 | b6 | b5 | b4 | b3 | b2 | b1 | b0 |
|---|---|---|---|---|---|---|---|---|
| 8000 | 0 | 0 | 0 | 0 | 0 | 0 | 0 | 1 |
| 1 | 0 | 0 | 0 | 0 | 0 | 0 | 0 | 1 |
| 2 | 0 | 0 | 0 | 0 | 0 | 0 | 0 | 0 |
| 3 | 0 | 0 | 1 | 0 | 0 | 0 | 1 | 0 |
| 4 | 0 | 0 | 1 | 1 | 1 | 1 | 1 | 1 |
| 5 | 0 | 0 | 1 | 0 | 0 | 0 | 1 | 1 |
| 6 | 0 | 0 | 0 | 1 | 0 | 0 | 1 | 0 |
| 7 | 0 | 0 | 0 | 0 | 1 | 1 | 0 | 0 |
| 8 | 0 | 0 | 0 | 0 | 0 | 1 | 0 | 0 |
| 9 | 0 | 0 | 0 | 0 | 0 | 0 | 1 | 0 |
| A | 0 | 0 | 0 | 0 | 0 | 0 | 0 | 0 |
| B | 0 | 0 | 0 | 0 | 0 | 0 | 0 | 0 |
| C | 0 | 0 | 1 | 1 | 1 | 1 | 1 | 0 |
| D | 0 | 0 | 0 | 0 | 0 | 0 | 1 | 0 |
| E | 0 | 0 | 0 | 0 | 0 | 0 | 1 | 0 |
| F | 0 | 0 | 0 | 0 | 0 | 0 | 1 | 0 |
| 10 | 0 | 0 | 1 | 1 | 1 | 1 | 1 | 0 |
| 11 | 0 | 0 | 0 | 0 | 0 | 0 | 0 | 0 |
| 12 | 0 | 0 | 0 | 0 | 0 | 0 | 0 | 0 |
| 13 | 0 | 0 | 0 | 0 | 0 | 0 | 0 | 0 |
| 14 | 0 | 0 | 0 | 0 | 0 | 0 | 0 | 0 |
| 15 | 0 | 0 | 0 | 0 | 0 | 0 | 0 | 0 |
| 16 | 0 | 0 | 1 | 1 | 1 | 1 | 1 | 0 |
| 17 | 0 | 0 | 0 | 0 | 0 | 0 | 0 | 0 |
| 18 | 0 | 0 | 0 | 0 | 0 | 0 | 0 | 0 |
| 19 | 0 | 0 | 0 | 0 | 0 | 0 | 0 | 0 |

FACSIMILE APPARATUS FOR PRODUCING AN IMAGE BY USING A NEWLY STORED FONT PATTERN

This application is a continuation of U.S. patent application Ser. No. 08/113,740, filed on Aug. 30, 1993, now abandoned.

BACKGROUND OF THE INVENTION

The present invention relates to a facsimile apparatus in which a plurality of font patterns indicating characters and graphic signs are stored in a storage memory, and an image relating to facsimile apparatus operation is printed on paper or displayed on a display part, so that the printed or displayed image comprises data represented by a font pattern data read from the storage memory.

In a conventional facsimile system, a CCD (charge coupled device) reader optically reads an image by raster scanning of a document so as to produce an image signal indicating the optical density of the document image. The image signal read by the CCD reader is converted by an A/D (analog-to-digital) converter into a digital image signal. Such digital image signals produced in this manner are subjected to several image processing processes including a shading correction process and an MTF (modulation transfer function) correction process, so that processed image data is produced. The processed image data is compressed by an encoding part to produce coded image data relating to the document image. This coded image data is modulated and transmitted by a communication part to a receiving facsimile station via a public transmission line.

There has been proposed an improved facsimile system which can transmit an image comprising facsimile sender data identifying a sender of the facsimile system. When image data is transmitted from the proposed facsimile system to a receiving facsimile station via a public transmission line, the facsimile sender data is added to the image data prior to the transmission. Thus, an operator at the receiving facsimile station can recognize who has transmitted the image by seeing the facsimile sender data when the image data is received. In addition, in the proposed facsimile system, a message relating to facsimile system operation can be displayed on a display part in order to assist the operator at the facsimile system, and a transmitting/receiving report relating to operational records of the facsimile system can be printed by a printing part.

However, in the proposed facsimile system described above, it is impossible to newly register a desired font pattern different from any of fixed font patterns which were installed in a ROM (read only memory) of the facsimile system at the time of the manufacture. Thus, when an image is received from or transmitted to the facsimile system and the facsimile sender data is represented by a font pattern different from any of the previously installed font patterns of a receiving facsimile station, the above described sender data transmitting function is not effective. For example, when an image comprising a facsimile sender data represented by a Japanese character font pattern is transmitted from a transmitting facsimile station in Japan to a receiving facsimile station in the United States of America, the facsimile sender data cannot be correctly reproduced by the receiving facsimile station since the previously installed font patterns thereof are only English character font patterns.

In addition, in the proposed facsimile system, it is difficult to display or print an image comprising characters or graphic signs represented by font patterns different from the previously installed font patterns of the ROM.

In order to eliminate the above described problems, it is desirable to provide a facsimile apparatus capable of storing a new font pattern in a storage memory, so that an image comprising data represented by font pattern data read from the storage memory can correctly be printed or displayed even when the data relates to font patterns different from the previously installed font patterns of the ROM.

SUMMARY OF THE INVENTION

Accordingly, it is a general object of the present invention to provide an improved facsimile apparatus in which the above described problems are eliminated.

Another, more specific object of the present invention is to provide a facsimile apparatus which is capable of storing a newly input font pattern in a storage memory of the facsimile apparatus and capable of printing or displaying an image that comprises text or graphic data represented by a stored font pattern data read from the storage memory.

The above mentioned objects of the present invention are achieved by a facsimile apparatus which includes a reading part for optically reading font pattern data by raster scanning of a font pattern sheet, the font pattern data comprising a plurality of dots arranged in a two-dimensional matrix formation, each dot being indicated by one of two optically different densities, and the font pattern data representing a font pattern of the font pattern sheet, a communication part for receiving image data from an external facsimile terminal via a telephone line, and for transmitting image data read from a document to an external facsimile terminal via the telephone line, a memory part for temporarily storing image data received or transmitted by the communication part, a printing part for printing an image on a recording sheet in accordance with the image data stored in the memory part, a converting part coupled to the reading part and to the memory part for converting the font pattern data read by the reading part into data indicating the font pattern of the font pattern sheet, and for supplying the converted data to the memory part, a storage part for storing the converted data produced by the converting part, and a control part for reading the converted data from the storage part, and for allowing the printing part to print an image by using the converted data read from the storage part, so that the printed image comprises data represented by the font pattern of the font pattern sheet.

According to the present invention, it is possible to print or display an image that comprises data represented by a newly stored font pattern data different from previously installed font pattern data of the facsimile apparatus. In addition, it is possible to easily store such a new font pattern data in the storage part of the facsimile apparatus, and it is possible that a plurality of sets of font pattern data be stored in the storage part, each set of font pattern data representing a desired combination of characters. In addition, it is possible for the facsimile apparatus of the present invention to transmit or receive an image that comprises text or graphic data represented by such a new font pattern data.

BRIEF DESCRIPTION OF THE DRAWINGS

Other objects, features and advantages of the present invention will become apparent from the following detailed description when read in conjunction with the accompanying drawings in which:

FIG. 6 is a diagram showing an example of bit pattern data stored in a first memory of the facsimile apparatus;

FIG. 7 is a diagram showing an example of bit pattern data stored in a second memory of the facsimile apparatus;

FIG. 12 is a view showing an example of a transmitting/receiving report which is printed by the facsimile apparatus in FIG. 10 by reading out a stored font pattern data;

FIG. 15 is a diagram showing bit pattern data stored in a new text memory of the facsimile apparatus in FIG. 10;

FIG. 22 is a diagram showing bit pattern data stored in a memory of the facsimile apparatus shown in FIG. 18;

DESCRIPTION OF THE PREFERRED EMBODIMENTS

A description will now be given of a first embodiment of the facsimile apparatus according to the present invention, with reference to FIGS. 1 through 7.

Figure 1:
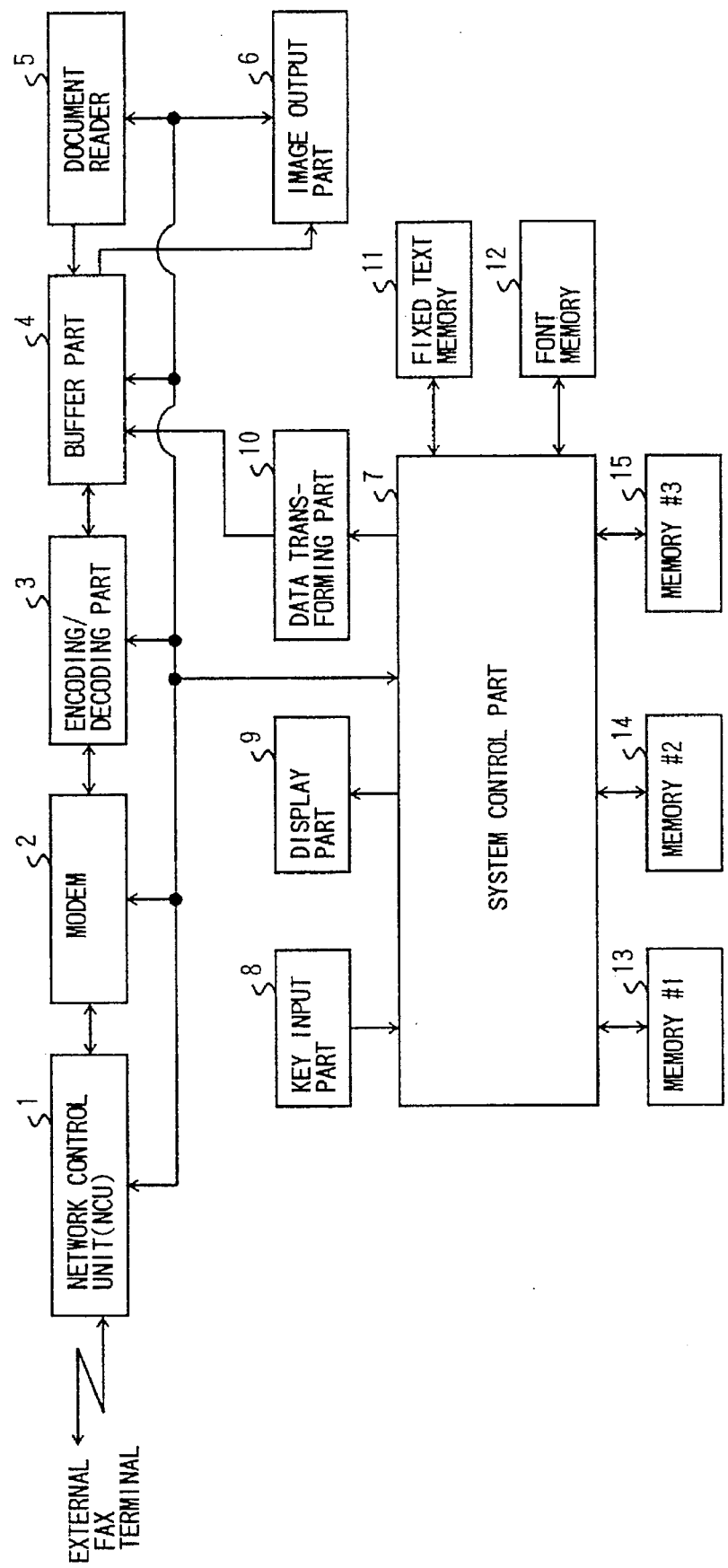
FIG. 1 is a block diagram showing a first embodiment of a facsimile apparatus according to the present invention.

FIG. 1 shows a facsimile apparatus provided in the first embodiment of the present invention. In FIG. 1, a network control unit (NCU) 1 carries out connection and disconnection of this facsimile apparatus to and from an external facsimile terminal (which is one of facsimile terminals connected to a communication network) via a telephone line. A modem 2 carries out modulation and demodulation of signals received by and transmitted from the facsimile apparatus. An encoding/decoding part 3 compresses image information by encoding the image information read from a document prior to the transmission thereof, and decompresses image information by decoding a received image information into the image information in the original form. A buffer part 4 temporarily stores image information to be transmitted to or received from an external facsimile terminal, and the buffer part 4 temporarily stores image information to be printed.

In FIG. 1, a document reader 5 optically reads an image from an original document by raster scanning of the document by a given resolution (e.g., 7.7 dots per millimeter in a vertical scanning direction and 8 dots per millimeter in a horizontal scanning direction). An image output part 6 prints a received image (having been transmitted from an external facsimile terminal), and prints a transmitting/receiving record of the facsimile apparatus. A system control part 7 is a main control unit for controlling various operations of component units of the facsimile apparatus. A key input part 8 is used by an operator to give instructions to the system control part 7 by depressing any keys of the key input part 8. A display part 9 displays a message indicating an operating condition of the facsimile apparatus, and displays an operational message to help an operator correctly input instructions for controlling the facsimile apparatus operation. The system control part 7 controls the operations of various component units of the facsimile apparatus in accordance with the instructions given by the operator from the key input part 8, and controls the operation of the display part 9 so that a message indicating an operating condition or an operational message for supporting the operator is displayed on the display part 9.

In the facsimile apparatus shown in FIG. 1, a data transforming part 10 reads a stored font pattern data from a storage memory, converts the font pattern data into a facsimile transmission data or an output image data, and adds the converted data to an image temporarily stored in the buffer part 4 so that the image is transmitted or printed by the image output part 6. A fixed text memory 11 stores a set of fixed text data which is previously registered when it is manufactured in factory. A font memory 12 stores a set of fixed font pattern data which is previously registered when it is manufactured in factory. In order to output an image including fixed text data, the fixed text data and fixed font pattern data are read from the fixed text memory 11 and the font memory 12. A first memory part 13, a second memory part 14, and a third memory part 15 are provided in the facsimile apparatus shown in FIG. 1. As shown in FIG. 1, the component parts 8 through 15 mentioned above are connected to the system control part 7, and the operations thereof are controlled by signals output from the system control part 7.

Figure 2:
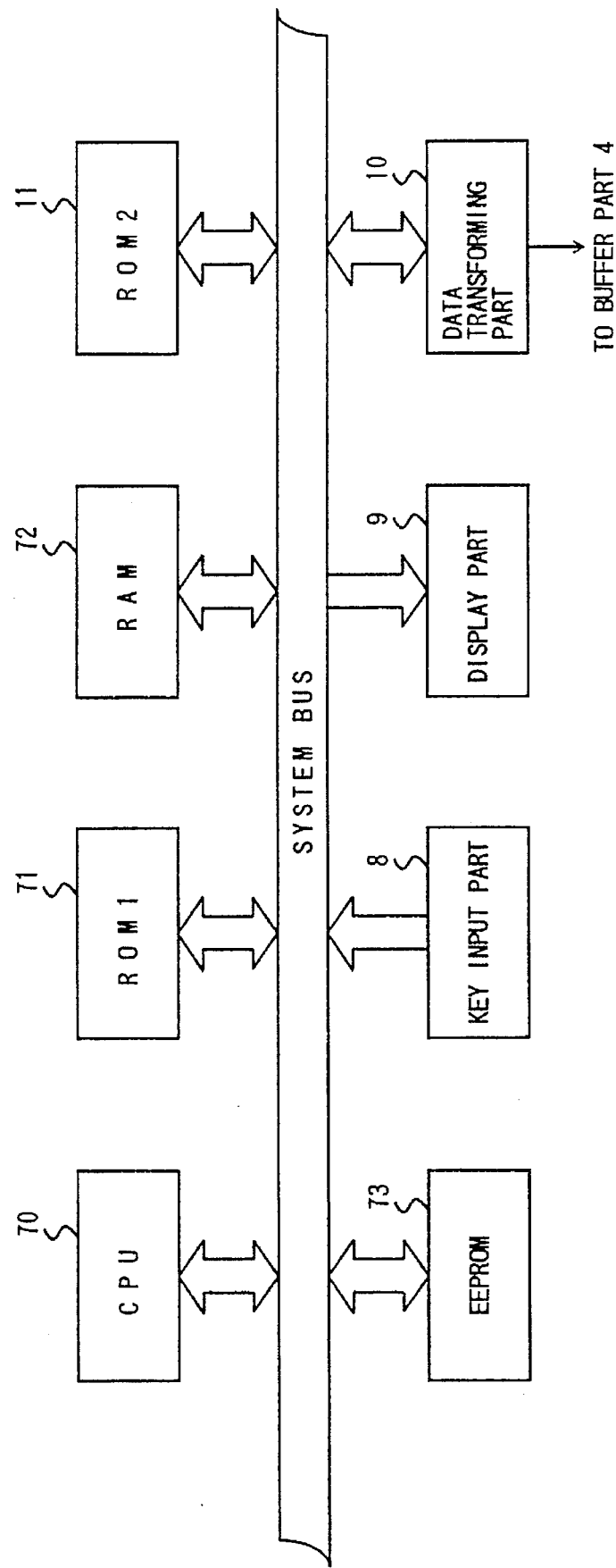
FIG. 2 is a block diagram showing a facsimile system to which the present invention is applied.

FIG. 2 shows a facsimile system to which the present invention is applied. The facsimile system shown in FIG. 2 comprises a central processing unit (CPU) 70, a first read-only memory (ROM) 71, a random-access memory (RAM) 72, an electrically erasable programmable read-only memory (EEPROM) 73, and a second read-only memory (ROM). The CPU 70 constitutes a microcomputer, and the system control part in FIG. 1 is formed with the CPU 70. The first ROM 71 stores system programs and parameters, and the CPU 70 carries out various control procedures of the facsimile system in accordance with the system programs and parameters of the first ROM 71. The second ROM is used by the CPU 70 as a work area when the control procedures are carried out. The fixed text memory 11 shown in FIG. 1 is formed with the second ROM. The font memory 12 and the first through third memory parts 13–15 shown in FIG. 1 are formed with the EEPROM 73. In FIG. 2, the facsimile system further comprises the key input part 8, the display part 9 and the data transforming part 10. The component units 70–73 and 8–11 mentioned above are interconnected by a system bus in the facsimile system in FIG. 2.

Figure 3:
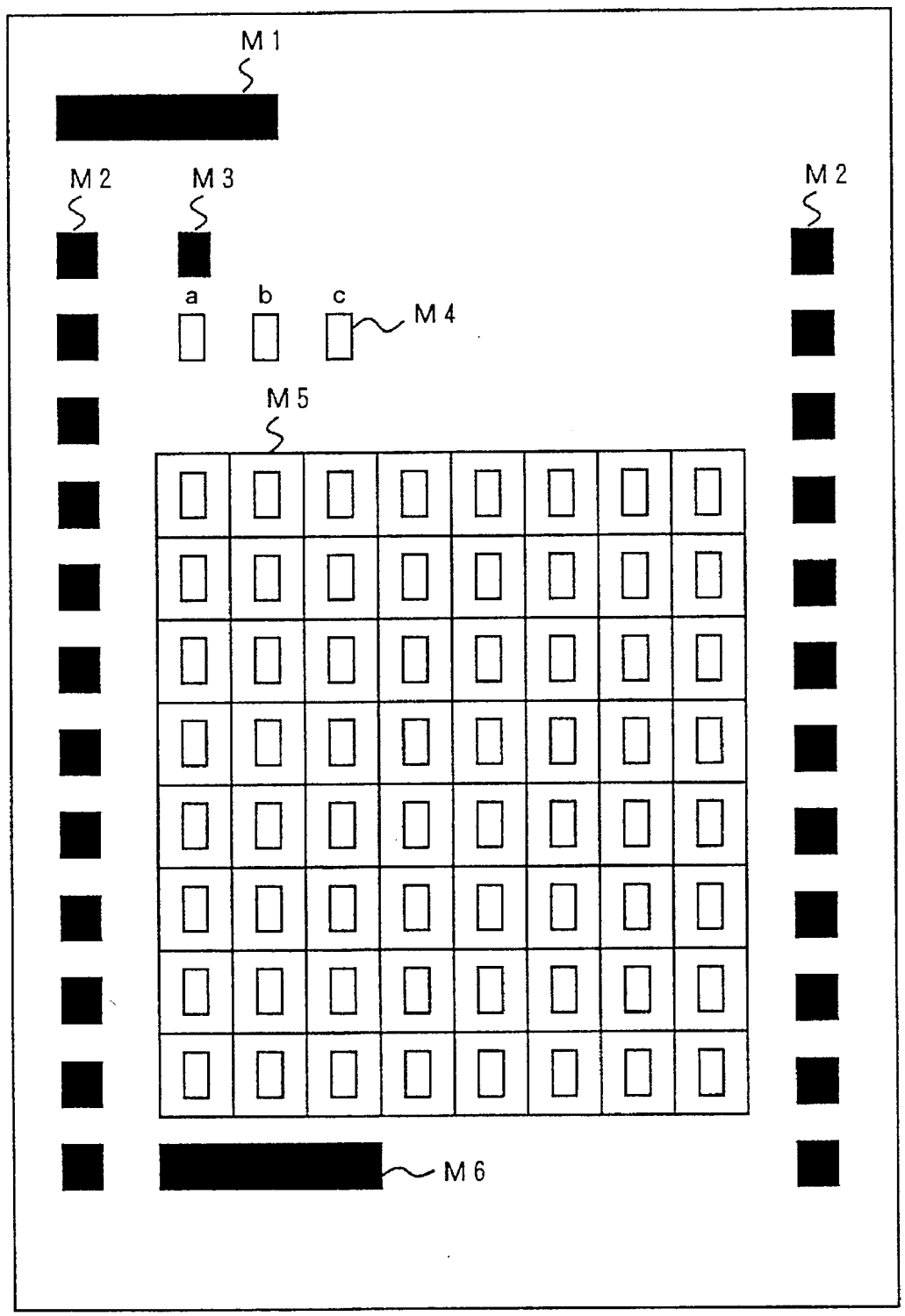
FIG. 3 is a view showing a form of a mark sheet used by the facsimile apparatus shown in FIG. 1.

FIG. 3 shows a form of a mark sheet used by the facsimile apparatus in FIG. 1. In the facsimile apparatus according to the present invention, a special-form mark sheet is read by the document reader 5 so as to store input font pattern data in a storage memory. This font pattern data of the mark sheet is formed with a plurality of dots arranged in an N×N dot matrix formation, each dot having a fixed size and being smudged in black or remaining unchanged as a white dot.

In the mark sheet form shown in FIG. 3, M1 denotes a start mark used to detect a reading start position at which the reading of the input font pattern from the mark sheet is started. This start mark M1 is used to detect whether a document or a mark sheet is being read. When the start mark M1 is smudged in black (indicated as a black mark in FIG. 3), it is detected that a mark sheet is being read. M2 denotes a plurality of side marks (which are all smudged in black and arranged along the right and left side lines of the mark sheet) used to detect a movement of the mark sheet relative to the document reader 5 in the vertical scanning direction when it is read. These side marks M2 are used to detect whether or not the mark sheet being read by the document reader 5 is inclined with respect to the vertical scanning direction.

In FIG. 3, M3 denotes a sheet type mark (which is smudged in black and located at a prescribed position with respect to the width direction of the mark sheet) used to indicate the type of the mark sheet. The sheet type mark M3 shown in FIG. 3 indicates that the type of the mark sheet is used for registering input font pattern data. A mark sheet of another type is indicated by a sheet type mark M3 located at a different position with respect to the width direction of the mark sheet. M4 denotes a font type mark used to indicate the type of the input font pattern in the language of concern. For example, the font type mark M4 comprises three separate marks "a", "b" and "c" shown in FIG. 3. If the mark "a" is smudged in black, the type of the input font pattern is an upper case character font. If the mark "b" is smudged in black, the type of the input font pattern is a lower case character font. If the mark "c" is smudged in black, the type of the input font pattern is a sign font.

In the mark sheet form shown in FIG. 3, M5 denotes the input font pattern, and it is formed with 8×8 dots arranged in an 8×8 dot matrix pattern, each dot being smudged in black or remaining unchanged as white dot. One of the 64 dots in the input font pattern M5 has a fixed size, and it is a rectangular mark which is 4 mm long and 1 mm wide. M6 denotes an end mark (which is smudged in black) used to detect a reading end position at which the reading of the input font pattern from the mark sheet is finished. Each dot of the font type mark M4 and the font pattern M5 and each outline of the font pattern M5 are printed with a special ink such as a drop-out color ink, in order to correctly detect each mark of the mark sheet by means of the document reader 5.

Figure 4:
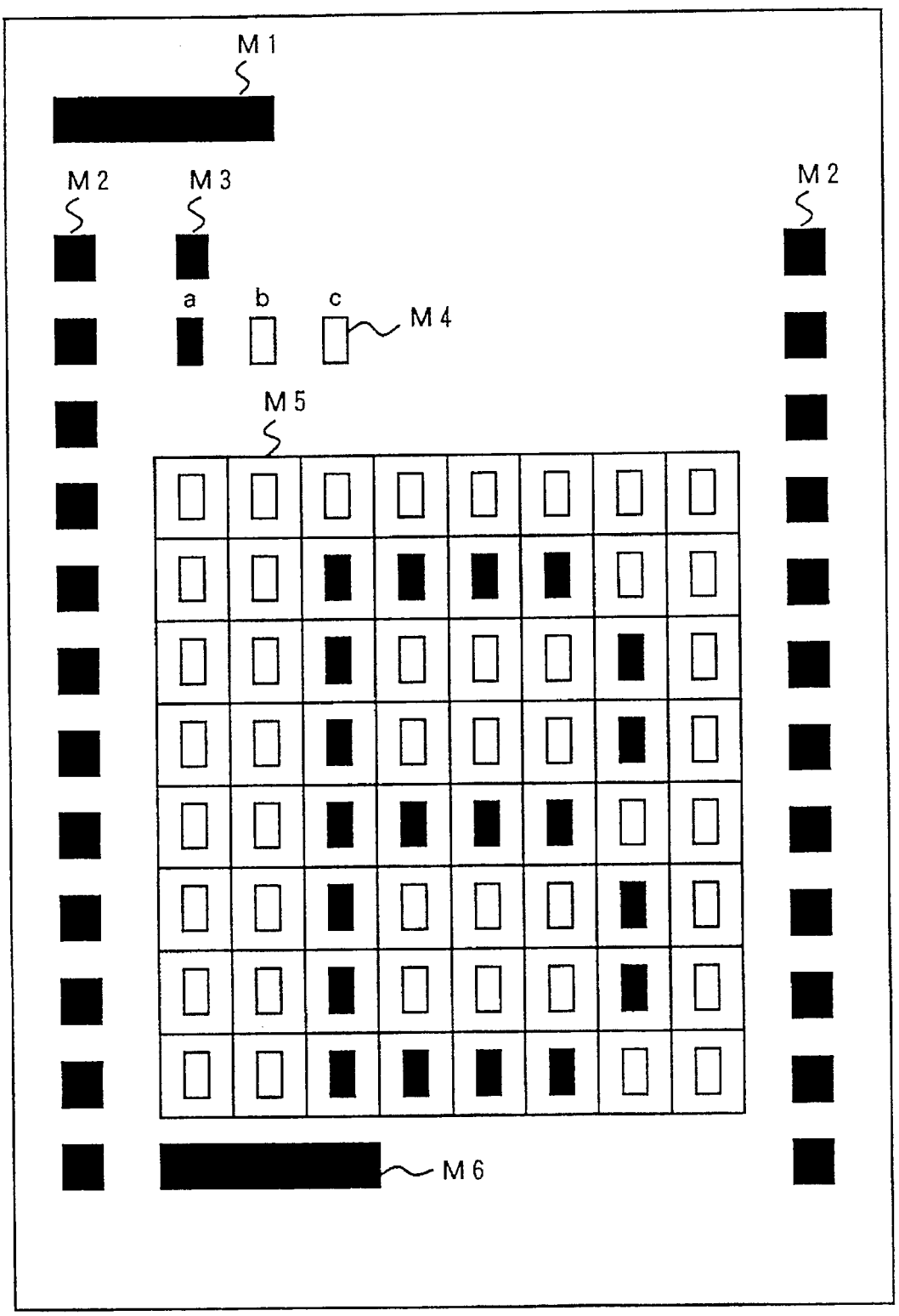
FIG. 4 is a view showing an example of a filled-in mark sheet which is read by the facsimile apparatus shown in FIG. 1.

FIG. 4 shows an example of a filled-in mark sheet which is used to register input font pattern data in the facsimile apparatus. The mark sheet shown in FIG. 4 is used to input the font pattern data of upper-case English character "B" to the facsimile apparatus. As shown in FIG. 4, the dots of the font pattern M5 of the mark sheet in FIG. 4 are smudged in black or remaining unchanged as white dot, so as to form the upper-case English character "B".

Figure 5:
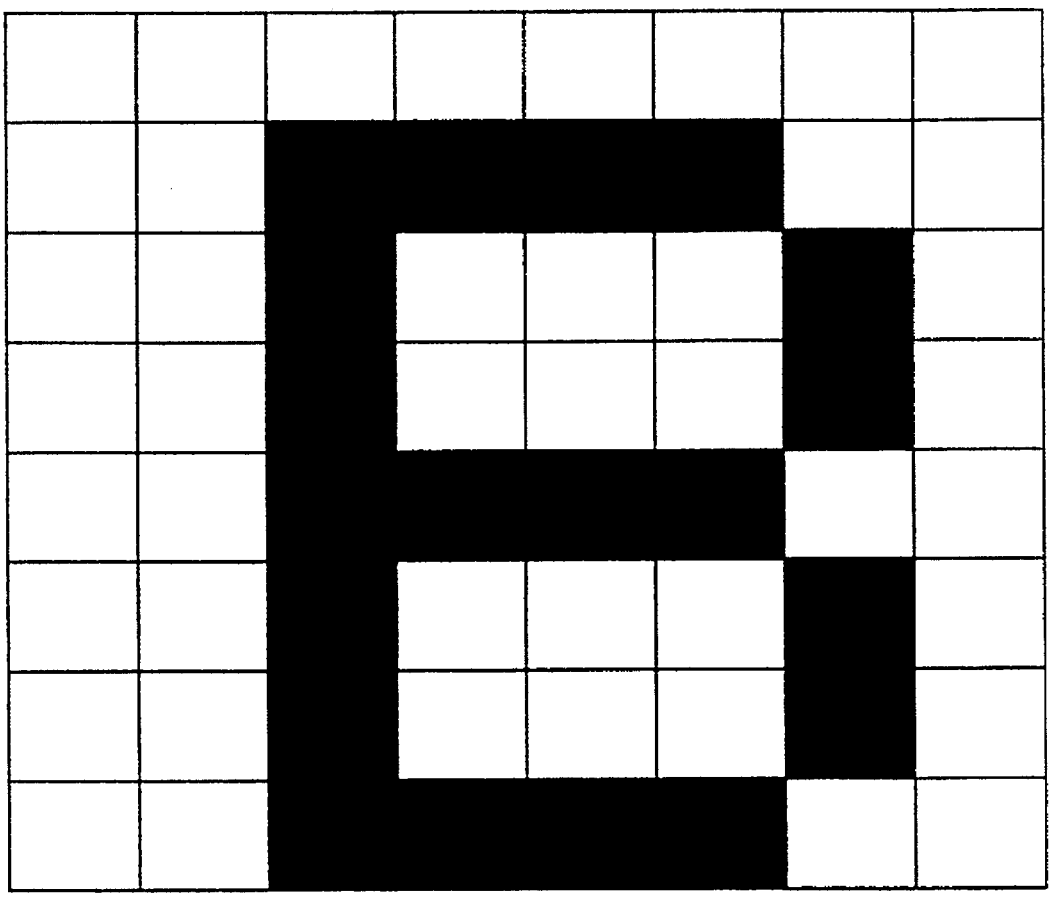
FIG. 5 is a view showing a character image which is displayed on a display part of the facsimile apparatus by reading out a stored font pattern.

FIG. 5 shows a character image which is displayed on the display part 9 of the facsimile apparatus in FIG. 1 by reading a stored font pattern data from a storage memory. The display part 9 is formed with an LED (liquid crystal display) unit having 64 segments arranged in an 8×8 matrix formation. As the mark sheet shown in FIG. 4 is read by the document reader 5 to register font pattern data of upper-case English character "B", a character image "B" shown in FIG. 5 is displayed on the display part 9 by reading the font pattern data from the storage memory. In order to print a character image by reading a stored font pattern data, it is necessary to adjust the size of the matrix pattern of the character image in accordance with the size of the input font pattern so that the character image is printed without enlarging or reducing the size.

FIG. 6 shows an example of bit pattern data (bi-level data) stored in the first memory part 13 of the facsimile apparatus in FIG. 1. As shown in FIG. 6, the storage address of the first memory part 13 starts with "8000". The input font pattern data read by the document reader 5 from the mark sheet is converted by the data transforming part 10 into bit pattern data, and such data is stored in the first memory part 13. FIG. 7 shows an example of bit pattern data stored in the second memory part 14 shown in FIG. 1.

Next, a description will be given of font pattern data reading and detecting procedures carried out by the facsimile apparatus of the first embodiment with reference to FIGS. 24A–24D and FIG. 25.

FIGS. 24A through 24D show the font pattern data reading procedure carried out by the facsimile apparatus in FIG. 1. In order to register newly input font pattern data in the facsimile apparatus, a filled-in mark sheet in which some dots of the font pattern M5 are smudged in black and the other remain unchanged as white dots so as to form the input font pattern, such as that shown in FIG. 4, is inserted into the document reader 5. Then the input font pattern data is read by the document reader 5 from the mark sheet. An operator depresses a mark sheet reading key of the key input part 8 and then depresses a document reading start key thereof, so that a reading start signal is input to the system control part 7. The font pattern data reading procedure in FIGS. 24A through 24D is started with the reading start signal.

Figure 24A:
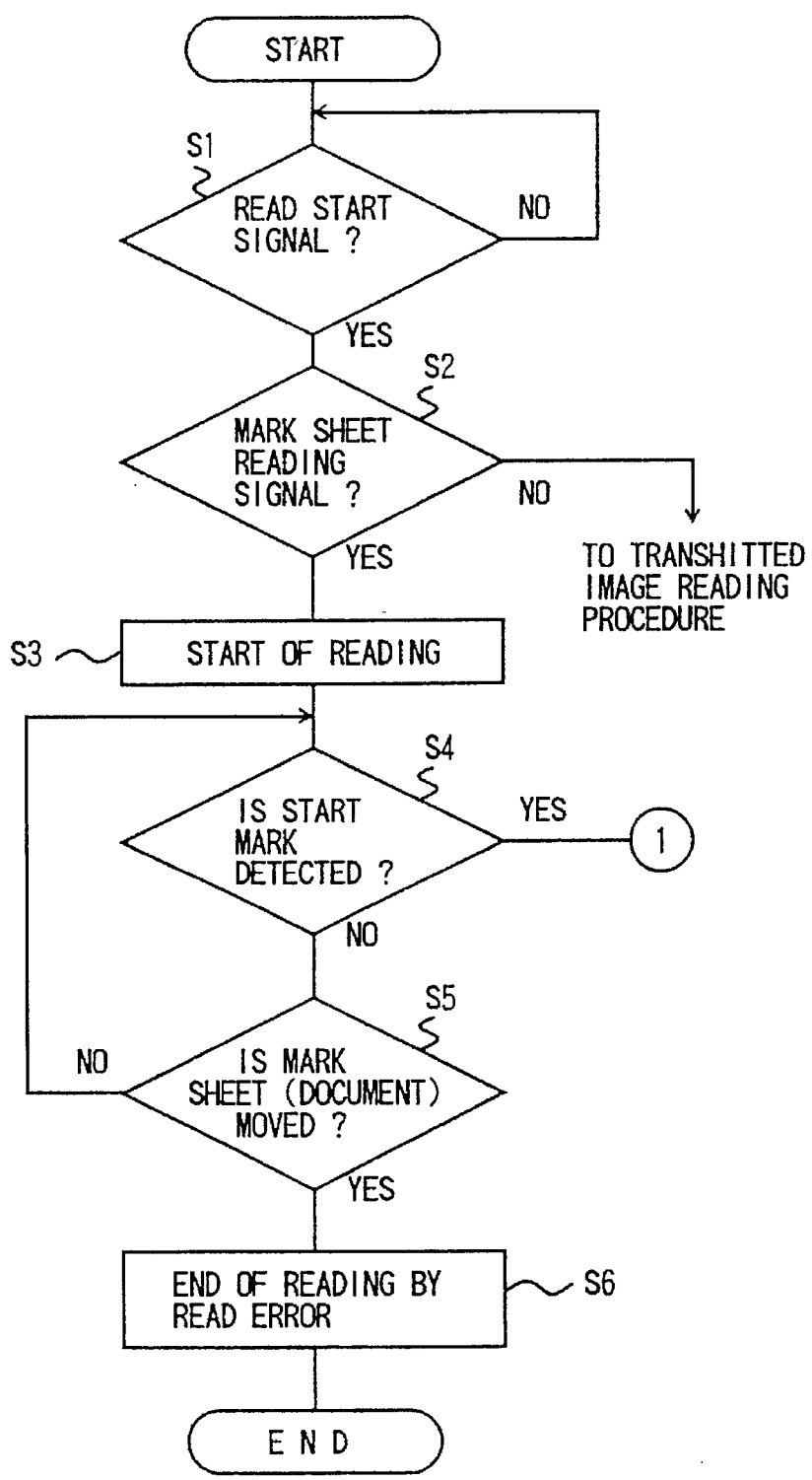
FIGS. 24A through 24D are a flow diagram for explaining a font pattern data input procedure performed by the facsimile apparatus shown in FIG. 1.

Step S1 in FIG. 24A detects whether the reading start signal is input to the system control part 7. If the answer to step S1 is affirmative, step S2 detects whether a mark sheet reading signal due to the depression of the mark sheet reading key is input to the system control part 7. If the answer to step S2 is affirmative, step S3 starts the reading of the mark sheet by means of the document reader 5.

Step S4 detects whether or not the start mark M1 (smudged in black) is read from the mark sheet. If the answer to step S4 is negative, step S5 detects whether or not the mark sheet is moved one line relative to the document reader 5. If the answer to step S5 is affirmative, it is determined that any reading error occurs with the document reader 5 of the facsimile apparatus, and step S6 finishes the reading of the mark sheet. If the answer to step S5 is negative, step S4 is repeated.

Figure 24B:
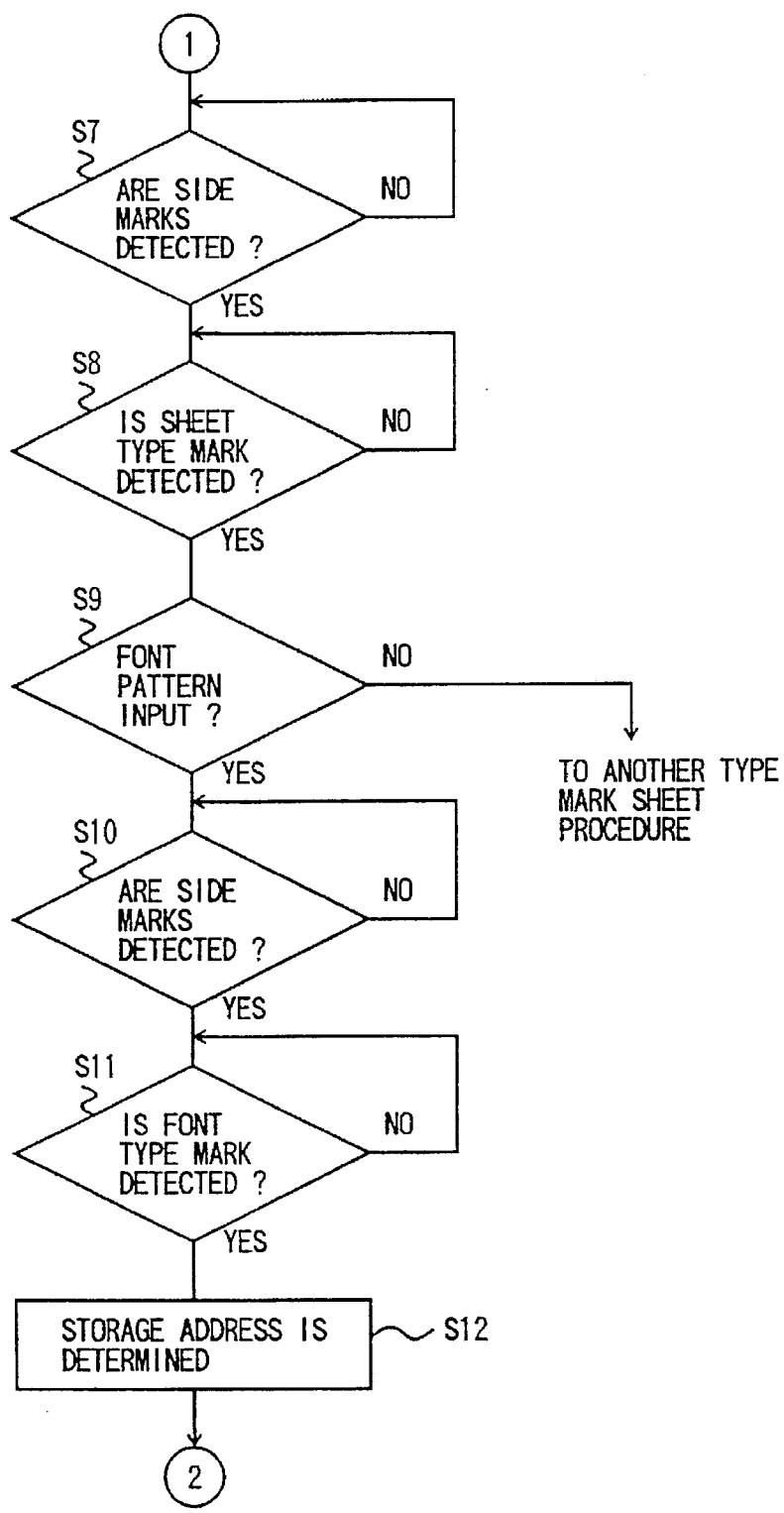

If the answer to step S4 is affirmative, steps S7 through S12 shown in FIG. 24B are performed. Step S7 detects whether the side marks M2 on a following line is read from the mark sheet. If the answer to step S7 is affirmative, step S8 detects whether the sheet type mark M3 is read from the mark sheet. If the answer to step S8 is affirmative, step S9 detects whether the sheet type mark M3 indicates the type of the mark sheet is used for registering input font pattern data. If the answer to step S9 is negative, the control is transferred to another type mark sheet procedure. If the answer to step S9 is affirmative, step S10 detects whether the side marks M2 on a following line are read from the mark sheet. If the answer to step S10 is affirmative, step S11 detects whether the font type mark M4 is read from the mark sheet. If the answer to step S11 is affirmative, step S12 determines a storage address at which the input font pattern data is stored in a storage memory (which is any of the first through third memory parts 13–15), based on the font type indicated by the font type mark M4. When the mark "a" of the font type mark M4 is smudged in black, a storage address of the first memory part 13 is determined in step S12.

Figure 24C:
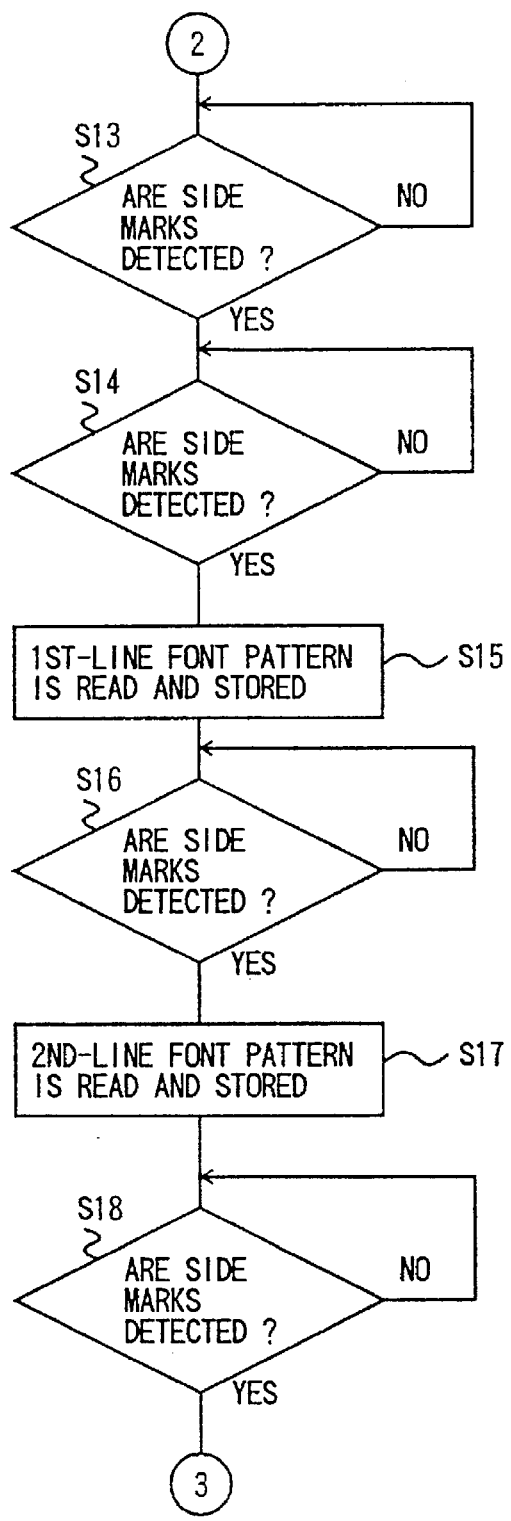

After step S12 is performed, steps S13 through S18 shown in FIG. 24C are performed. Step S13 detects whether the side marks M2 on a following line are read from the mark sheet. There is not any other mark to be read (different from the side marks M2) on this line of the mark sheet. If the answer to step S13 is affirmative, step S14 detects whether the side marks M2 on a following line are read from the mark sheet. If the answer to step S14 is affirmative, step S15 performs a font pattern data detecting procedure in which a first-line data of the font pattern M5 is read from the mark sheet and the font pattern data is stored in the first memory part 13 at a determined storage address. The font pattern data detecting procedure will be described later. Step S16 detects whether the side marks M2 on a following line are read from the mark sheet. If the answer to step S16 is affirmative, step S17 performs the font pattern data detecting procedure in which a second-line data of the font pattern M5 is read from the mark sheet and the font pattern data is stored in the first memory part 13 at a determined storage address. Step S18 detects whether the side marks on a following line are read from the mark sheet.

Figure 24D:
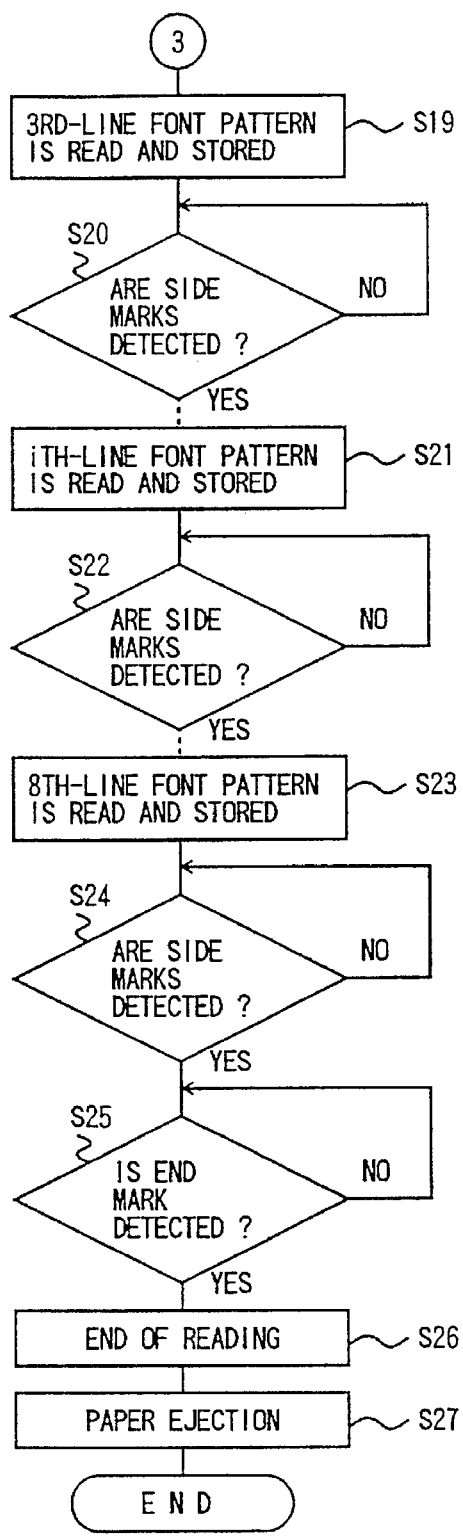

If the answer to step S18 is affirmative, steps S19 through S27 shown in FIG. 24D are performed. Steps S19–S20, S21–S22, and S23–S24 are essentially the same as the steps S17–S18 described above, and, in these steps, third-line through 8th-line data of the font pattern M5 are read and sequentially stored in the first memory part 13, and the side marks M2 on the subsequent lines are detected. If the answer to step S24 is affirmative, step S25 detects whether the end mark M6 on the last line is read from the mark sheet. If the answer to step S25 is affirmative, step S26 ends the reading of the mark sheet, and step S27 ejects the mark sheet from the document reader 5. The font pattern data reading procedure shown in FIGS. 24A–24D ends.

Figure 25:
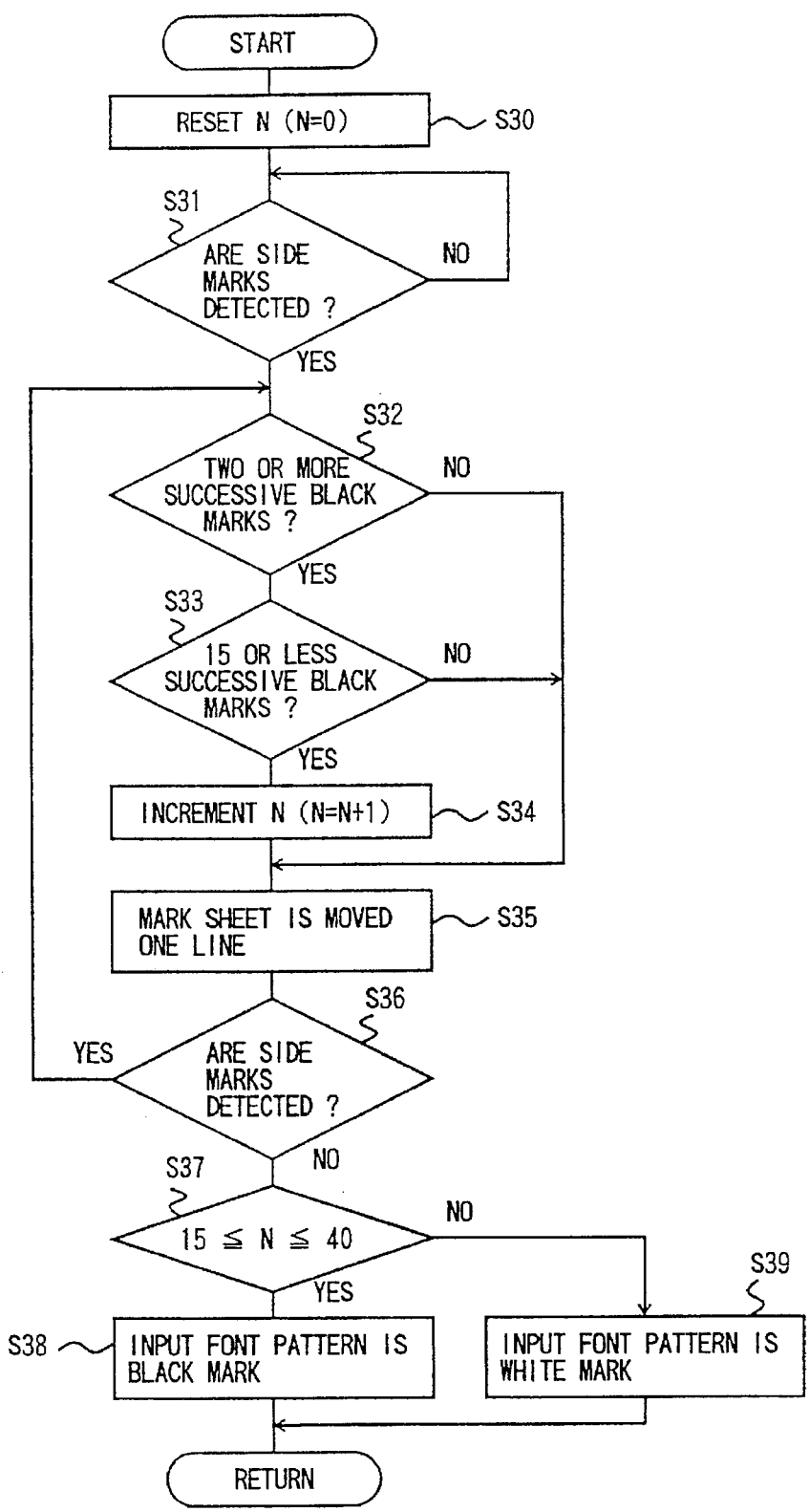
FIG. 25 is a flow diagram for explaining a font pattern data detecting procedure performed by the facsimile apparatus shown in FIG. 1.

FIG. 25 shows the font type data detecting procedure performed by the facsimile apparatus shown in FIG. 1. This procedure is performed in each of the steps S15, S17, S19, S21 and S23 described above. Step S30 in the procedure shown in FIG. 25 resets a counter N to zero (N=0). Step S31 detects whether the side marks M2 on the line of concern are read from the mark sheet. If the answer to step S31 is affirmative, step S32 detects whether there are two or more successive black dots within the font pattern M5. If the answer to step S32 is affirmative, step S33 detects whether there are 15 or less successive black dots within the font pattern M5. If the answer to step S33 is affirmative, step S34 increments the counter N (N=N+1). Step S35 moves the mark sheet one line relative to the document reader 5.

If the answer to either step S32 or step S33 is negative, step S34 is not performed and only step S35 is performed. After step S35 is performed, step S36 detects whether the side marks M2 on a following line are read from the mark sheet. As far as the answer to step S36 is affirmative, the steps S32–S35 described above are repeatedly performed. In these steps, the above described black dot detecting and font pattern data storing are performed until no side marks M2 on the following line are read from the mark sheet.

If the reading and storing of the font pattern data is completed and the answer to step S36 is negative, step S37 detects whether the value of the counter N is greater than 15 and smaller than 40 (15≦N≦40). If the answer to step S37 is affirmative, step S38 determines that the input font pattern M5 of the mark sheet is a black mark. If the answer to step S37 is negative, step S39 determines that the input font pattern M5 of the mark sheet is a white mark. The font pattern data detecting procedure shown in FIG. 25 is finished.

Next, the bit pattern data (or the converted font pattern data) stored in the first memory part 13 will be described with reference to FIG. 6. At each storage address of the first memory part 13 shown in FIG. 6, 8-bit data "b0" through "b7" (one byte) is stored. A first 16-bit data at addresses "8000" and "8001" in FIG. 6 is a first directory data indicating the presence of each of 16 font patterns stored in the first memory part 13. A second 16-bit data at addresses "8002" and "8003" in FIG. 6 is a second directory data indicating the presence of each of different 16 font patterns stored in the first memory part 13. A third 16-bit data at addresses "8004" and "8005" in FIG. 6 is a third directory data indicating the presence of each of further 16 font patterns stored in the first memory part 13. Thus, a total of 48 font patterns can be stored in the first memory part 13, and three different types of font pattern data are separately stored in three areas of the first memory part 13.

In FIG. 6, a first bit pattern data (corresponding to a first font pattern data read by the document reader 5 from a mark sheet and converted by the data transforming part 10) is stored in an 8-byte area of the first memory part 13 at addresses "8006" through "800D". The bit "b0" at the address "8000" in the first directory data indicates whether or not a font pattern is stored in this memory area. If the bit "b0" is equal to "1", a font pattern is stored in the memory area. If the bit "b0" is equal to "0", no font pattern is stored in the memory area. Similarly, a second bit pattern data is stored in another 8-byte area of the first memory part 13 at addresses "800E" through "8015" in FIG. 6. The bit "b1" at the address "8000" in the first directory data indicates whether or not a font pattern is stored in the memory area. In this manner, each bit of the first directory data indicates the presence of each of 16 font patterns stored in the first memory part 13.

For example, in a case of the bit pattern data shown in FIG. 6, the bits "b0" and "b1" at the address "8000" are equal to "1", which indicates that two font patterns are stored in the first memory part 13. In the 8-byte area at the addresses "8006"–"800D", a bit pattern data corresponding to a font pattern of upper-case English character "A" is stored. In the 8-byte area at the addresses "800E"–"8015", a bit pattern data corresponding to a font pattern of upper-case English character "B" is stored. The checking and storing of the directory data and font pattern data in the first memory part 13 described above is carried out by the system control part 7 (the CPU 70) of the facsimile apparatus in FIG. 1.

The system control part 7 carries out a font pattern checking procedure as well as a font pattern deleting procedure in accordance with the instructions supplied by an operator from the key input part 8. For example, when the display of font pattern data is requested by an operator from the key input part 8 and the instructions for font pattern checking are input by the operator, the system control part 7 reads a font pattern data from the first memory part 13 (the corresponding bit data is equal to 1) and displays the font pattern data on the display part 9. If the displayed font pattern is found wrong or undesired, a request for font pattern deletion can be input by the operator from the key input part 8. If such a request is made, the system control part 7 deletes a previously stored bit pattern data of the first memory part 13 (corresponding to the font pattern data of concern), and resets a corresponding bit of the directory data to zero.

Next, the bit pattern data stored in the second memory part 14 will be described with reference to FIG. 7. In the second memory part 14, bit pattern data corresponding to a plurality of sets of text or graphic data (characters) is stored. In the second memory part 14 of the facsimile apparatus in FIG. 1, a set of text or graphic data (one character) is represented by eight font patterns (8×8 bytes), and therefore the bit pattern data amounting to a total of 16 sets of text or graphic data (16 characters) can be stored in the second memory part 14 of the first embodiment.

Similarly to the bit pattern data of the first memory part 13 in FIG. 6, at each storage address of the second memory part 14 in FIG. 7, 8-bit data "b0" through "b7" (one byte) is stored. A first 16-bit data at addresses "9000" and "9001" in FIG. 7 is a main directory data indicating the presence of each of 16 sets of text or graphic data stored in the second memory part 14. A second 8-bit data at an address "9002" in FIG. 7 is a sub-directory data indicating the effective word length of of a first set of text or graphic data stored in the second memory part 14. This sub-directory data is attached to the beginning of each set of text or graphic data in the second memory part 14.

For example, in FIG. 7, the first set of text or graphic data (corresponding to a 64-bit data read by the document reader 5 from a mark sheet and converted by the data transforming part 10) is stored in an 8-byte area of the second memory part 14 at addresses "9003" through "9043". As the bits "b0" through "b4" at the address "9002" in the sub-directory data are equal to "1" and the other bits are equal to "0", this sub-directory data indicates that the effective word length of the first set of text or graphic data is equal to 5. Thus, the first set of text or graphic data is comprised of five font patterns (5×8 bit data) only, and the remaining data (3×8 bit data) in this area is not effective. In the area (at addresses "9003" through "9020" of the bit pattern data in FIG. 7, a 3-byte font pattern data representing the first three characters of the English word "ERROR" is indicated.

In order to store a new set of text or graphic data in the second memory part 14, an operator inputs the font pattern display instructions from the key input part 8. The system control part 7 reads any font patterns from the font memory 12 or the first memory part 13, and displays each of the font patterns on the display part 9. The operator selects a desired set of text or graphic data from among such displayed font patterns, and inputs the instructions for the font pattern data reading procedure from the key input part 8, so that the selected set of text or graphic data is stored in the second memory part 14 by the system control part 7.

In order to display any set of text or graphic data previously stored in the second memory part 14, the operator inputs a request for text data display from the key input part 8. When such a request is made, the system control part 7 reads the set of text or graphic data from the second memory part 14, and displays the data on the display part 9.

The third memory part 15 shown in FIG. 1 is provided in order for storing a plurality of sets of text or graphic data which is read out by the system control part 7 when an image containing any sets of text or graphic data is printed by the image output part 6. A procedure for storing such text or graphic data in the third memory part 15 and a procedure for printing an image containing any sets of the stored text or graphic data by means of the image output part 6 are essentially the same as the above described procedures relating to the second memory part 14.

Next, a description will be given of a second embodiment of the facsimile apparatus according to the present invention, with reference to FIGS. 8 and 9. This embodiment enables the font pattern data input procedure to be carried out by using a special-form bar-code sheet, instead of using the special-form mark sheet relating to the first embodiment.

Figure 8:
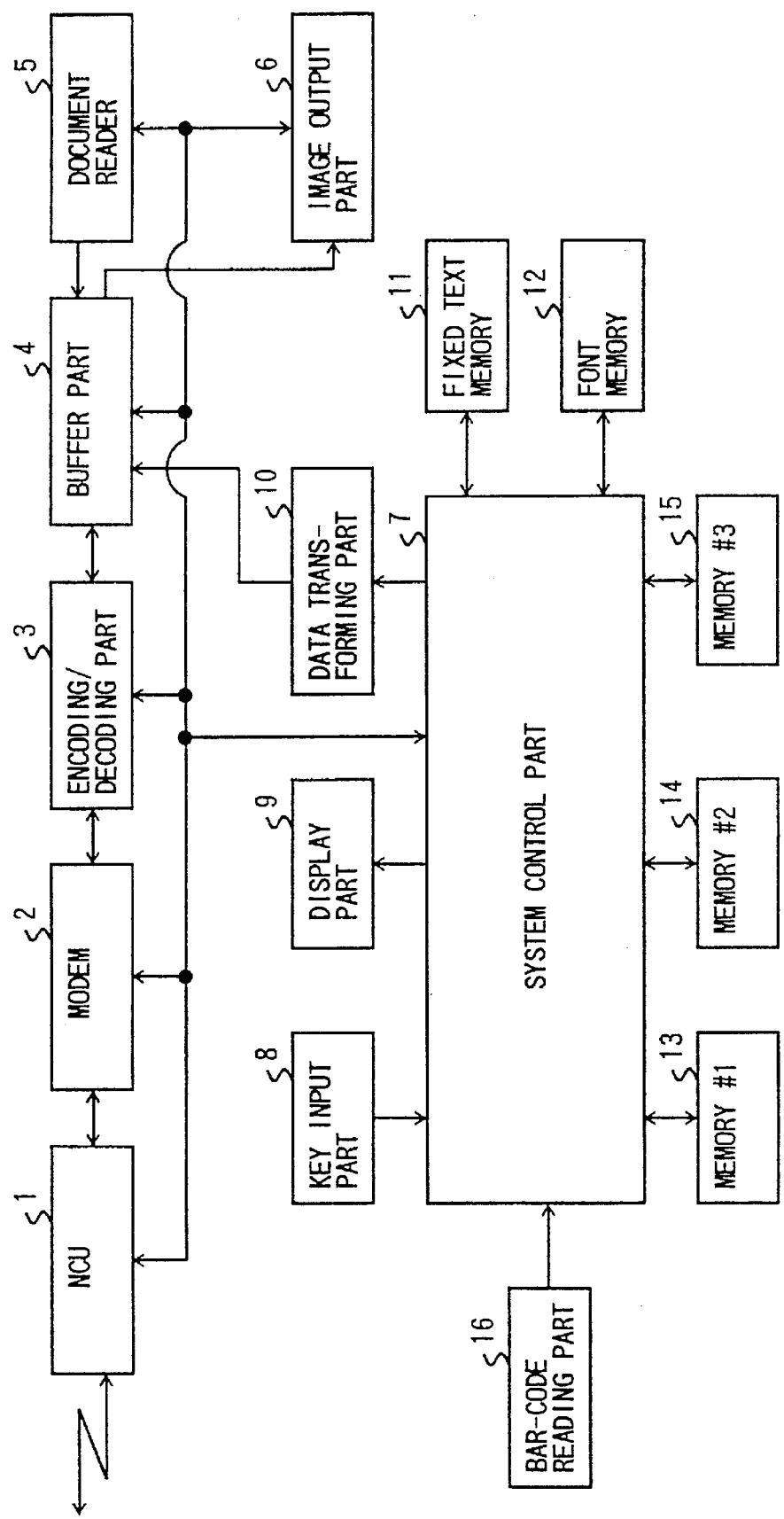
FIG. 8 is a block diagram showing a second embodiment of the facsimile apparatus according to the present invention.

FIG. 8 shows a facsimile apparatus provided in the second embodiment of the present invention. In FIG. 8, the parts which are the same as corresponding parts shown in FIG. 1 are designated by the same reference numerals and a description thereof will be omitted. In the facsimile apparatus shown in FIG. 8, a bar-code reading part 16 is connected to the system control part 7, and this bar-code reading part 16 optically reads font pattern data from a special-form bar-code sheet. The font pattern data read by the bar-code reading part 16 comprises a plurality of bar codes which are indicated by combinations of bars having two different thicknesses. The operation of the facsimile apparatus in FIG. 8 relating to the reading and storing of the input font pattern is similar to the operation of the facsimile apparatus in FIG. 1.

Figure 9:
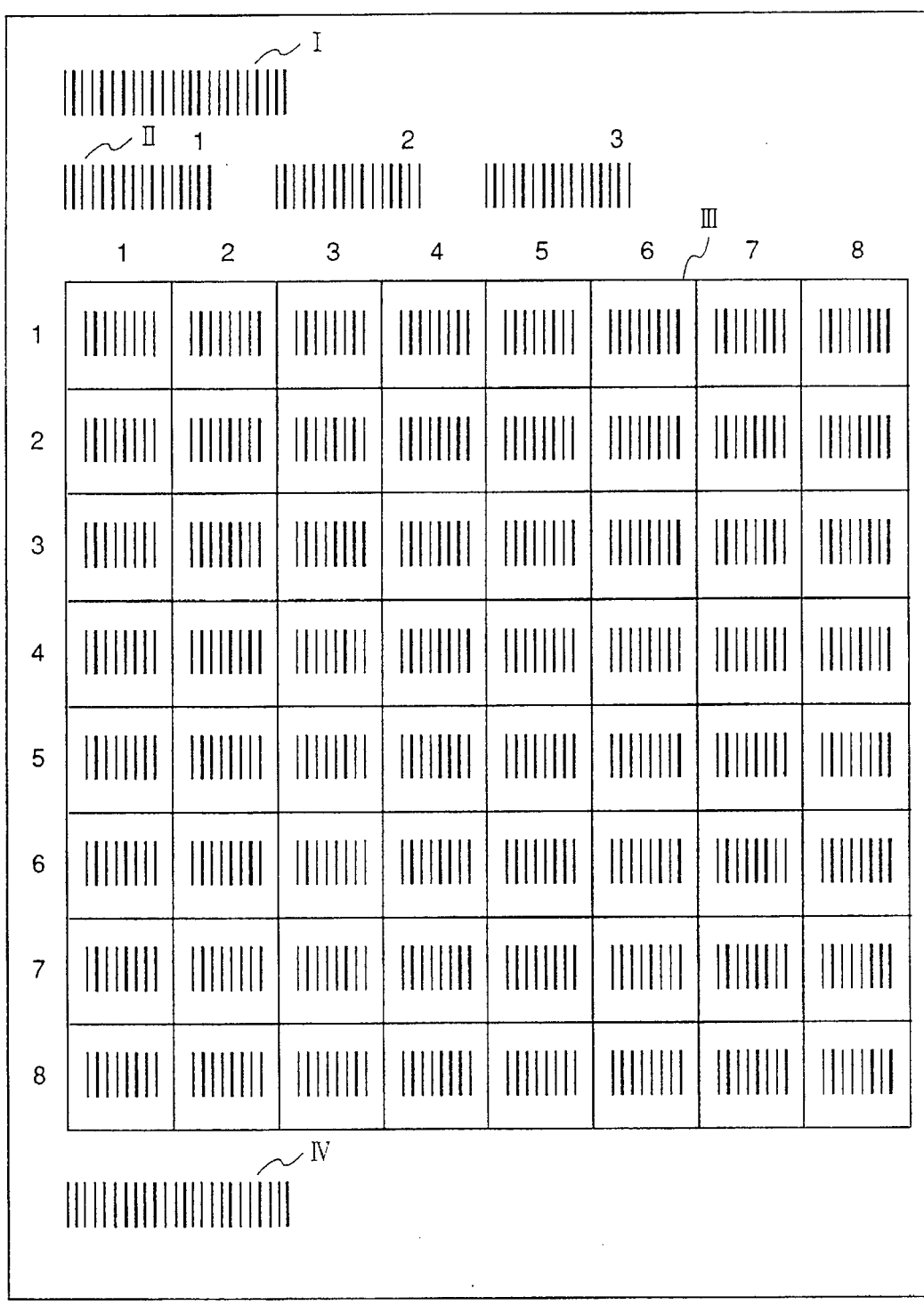
FIG. 9 is a view showing a form of a bar-code sheet used by the facsimile apparatus shown in FIG. 8.

FIG. 9 shows a form of this bar-code sheet used by the facsimile apparatus in FIG. 8. In FIG. 9, "I" denotes a read-start bar code used to detect a reading start position at which the reading of the input font pattern from the bar-code sheet is started. "II" denotes a font type bar code used to indicate the type of the input font pattern. The font type bar code II comprises three separate bar codes "1", "2" and "3" shown in FIG. 9, each bar code indicating a different font pattern type.

In the bar-code sheet form shown in FIG. 9, "III" denote separating lines by which 8×8 bar codes arranged in an 8×8 matrix formation are separated from each other so as to form 64 square segments, each bar code being indicated by combinations of thin and thick bars. Each of the 64 bar codes contains address data indicating a relative position of the bar code within the 64 segments. "IV" denotes a read-end bar code used to detect a reading end position at which the reading of the input font pattern from the bar code sheet is finished.

Next, a description will be given of a third embodiment of the facsimile apparatus according to the present invention, with reference to FIGS. 10 through 15. This third embodiment enables a plurality of sets of new font patterns (corresponding to combinations of characters or words) to be stored in a storage memory by using a special-form mark sheet.

Figure 10:
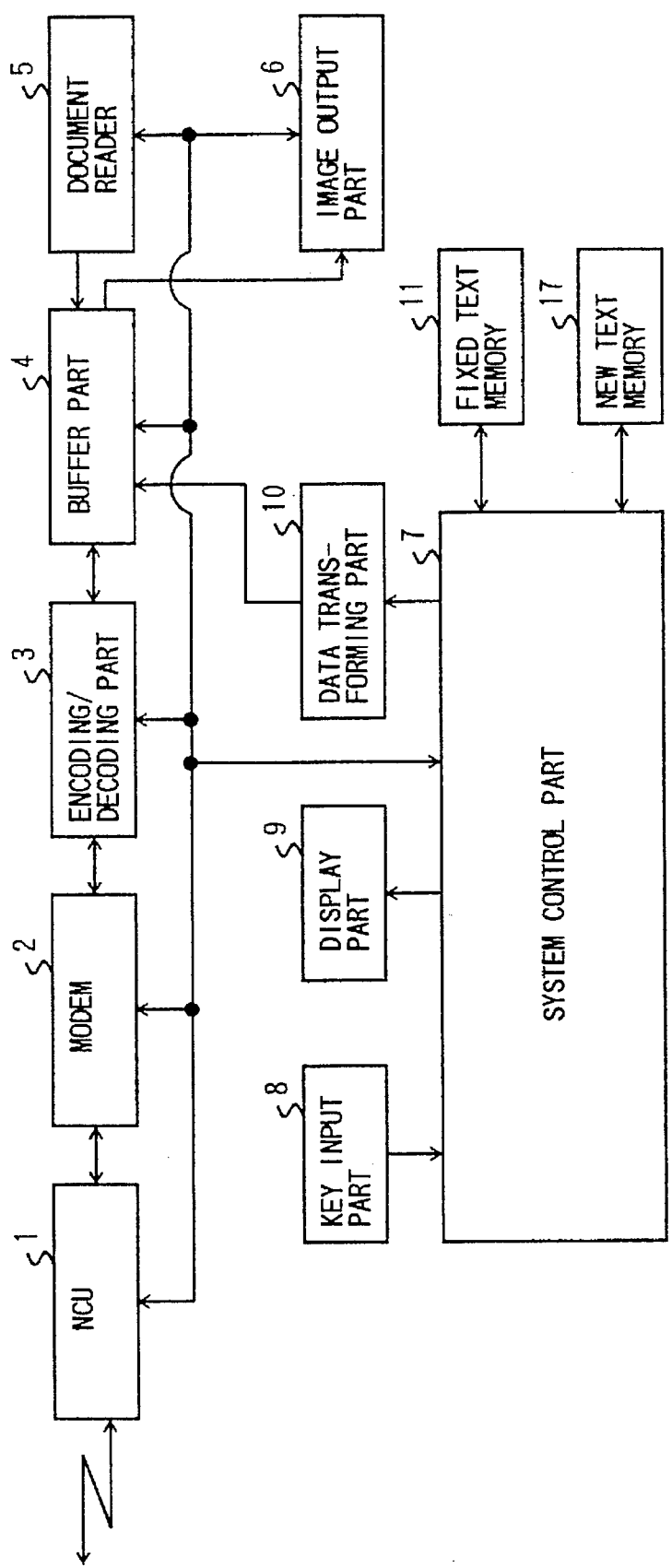
FIG. 10 is a block diagram showing a third embodiment of the facsimile apparatus according to the present invention.

FIG. 10 shows a facsimile apparatus provided in the third embodiment of the present invention. In FIG. 10, the parts which are the same as corresponding parts shown in FIG. 1 are designated by the same reference numerals and a description thereof will be omitted. In the facsimile apparatus shown in FIG. 8, no memory parts 13–15 in FIG. 1 are connected to the system control part 7, and a new text memory 17 is connected to the system control part 7 instead of the font memory 12 in FIG. 1. This new text memory 17 is provided to store a plurality of new font patterns read from a special-form mark sheet. The new text memory 17 is formed with the EEPROM 73 shown in FIG. 2.

Figure 11:
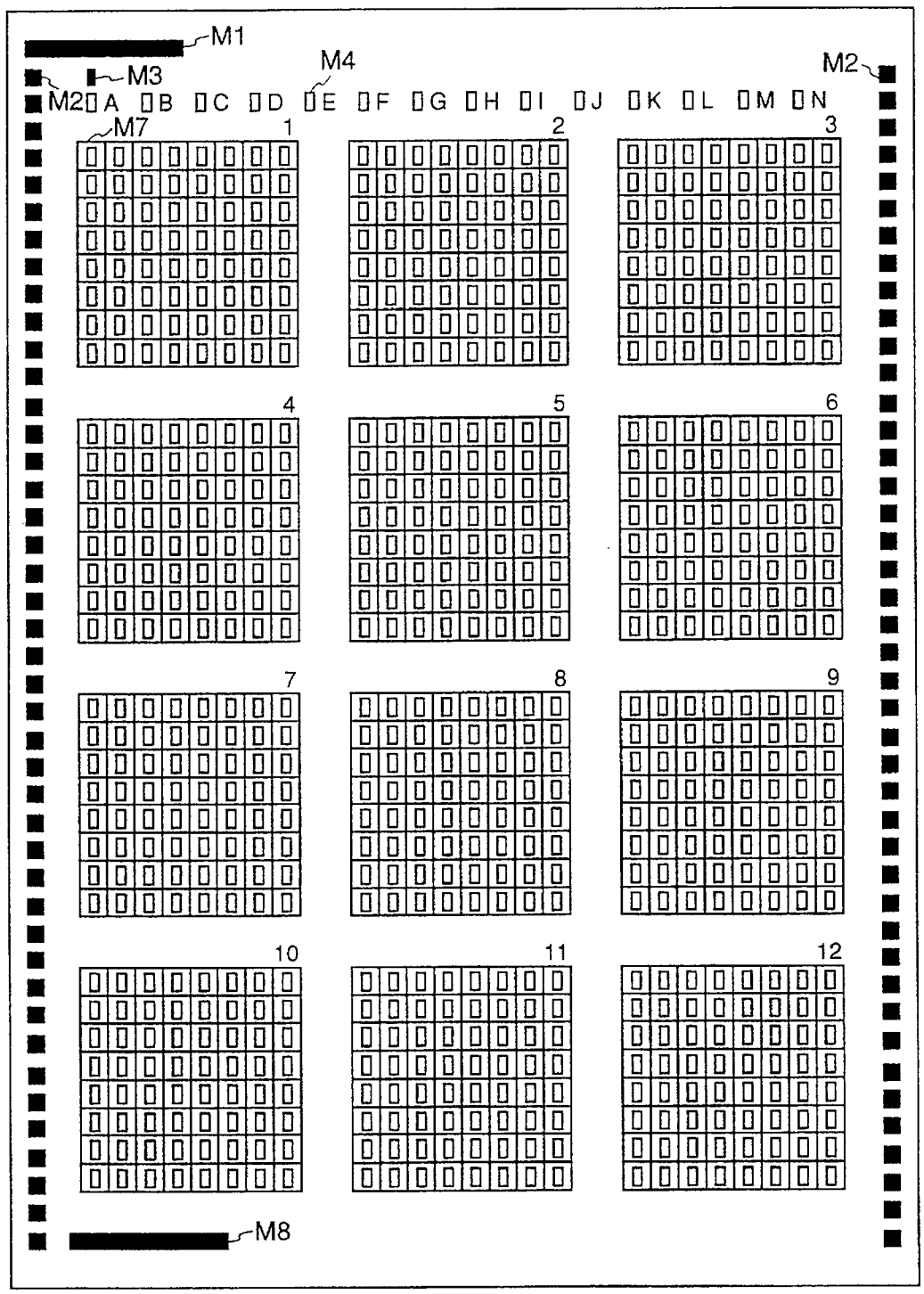
FIG. 11 is a view showing a form of a mark sheet used by the facsimile apparatus shown in FIG. 10.

FIG. 11 shows the form of a mark sheet used by the facsimile apparatus in FIG. 10. This special-form mark sheet in FIG. 11 is read by the document reader 5 in FIG. 10 so as to store a plurality of new font patterns in a storage memory at a time. As shown in FIG. 11, the mark sheet includes twelve input font pattern data, each font pattern data is formed with a plurality of dots arranged in an 8×8 dot matrix formation, each dot having a fixed size and being smudged in black or remaining unchanged as a white dot.

In the mark sheet form shown in FIG. 11, M1 denotes a start mark used to detect a reading start position at which the reading of the input font pattern from the mark sheet is started. M2 denotes a plurality of side marks (all smudged in black and arranged along the right and left side lines of the mark sheet) used to detect a movement of the mark sheet relative to the document reader 5 in the vertical scanning direction when the mark sheet is being read. M3 denotes a sheet type mark (smudged in black and located at a prescribed position with respect to the width direction of the mark sheet) used to indicate that the mark sheet is of the type for inputting a plurality of new font patterns. M4 denotes a font type mark used to indicate the type of the input font patterns (the type of the combination of characters or the word represented by the input font patterns). The font type mark M4 shown in FIG. 11 comprises fourteen marks "A" through "N", and therefore fourteen different types of the input font patterns are distinguishable by smudging in black one of the fourteen marks "A" through "N" of the font type mark M4.

In the mark sheet form shown in FIG. 11, M7 denotes the twelve input font patterns, and each input font pattern (representing one character) is formed with 64 dots arranged in an 8×8 matrix formation, and each dot being smudged in black or remaining unchanged as white dot. Any combination of characters is formed with the twelve input font patterns. When an input font pattern in which all the 64 dots remain unchanged as white dots indicates a blank or an empty space. M8 denotes an end mark (smudged in blank) used to detect a reading end position at which the reading of the input font patterns from the mark sheet is finished. The others relating to the mark sheet form in FIG. 11 are essentially the same as corresponding features of the mark sheet in FIG. 3.

FIG. 12 shows an example of a transmitting/receiving report which is printed by the image output part 6 of the facsimile apparatus in FIG. 10 by reading out a stored font pattern data. The system control part 7 reads the stored font pattern data from the new text memory 17, and allows the converted data of the data transforming part 10 to be supplied to the buffer part 4, so that the transmitting/receiving report shown in FIG. 10 is printed by the image output part 6.

Figure 13:
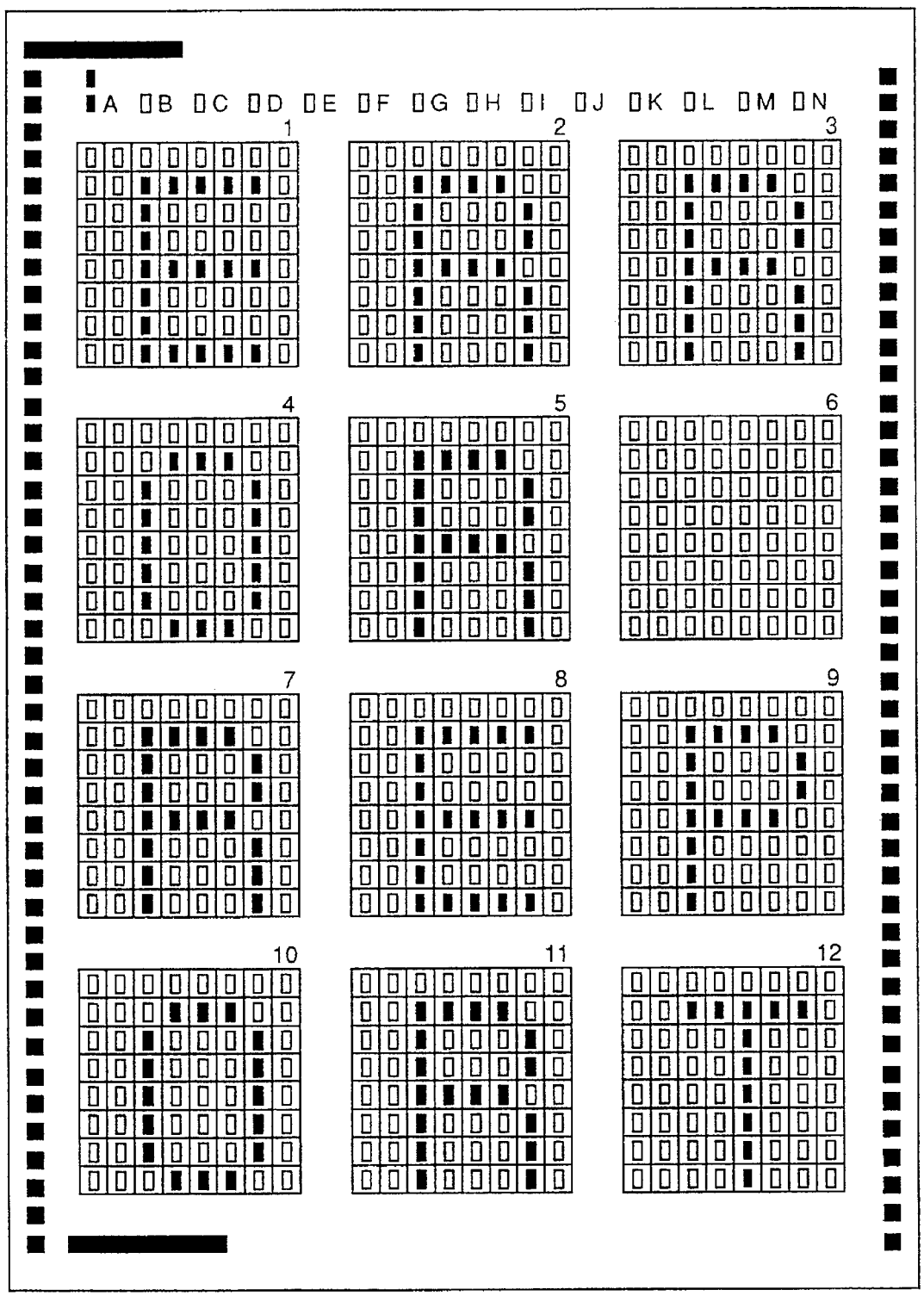
FIG. 13 is a view showing an example of a filled-in mark sheet which is read by the facsimile apparatus shown in FIG. 10.

FIG. 13 shows an example of a filled-in mark sheet used by the facsimile apparatus of the third embodiment to register a plurality of new font patterns in the facsimile apparatus. This mark sheet shown in FIG. 13 is used to register a plurality of font patterns corresponding to upper-case English characters "ERROR REPORT" in the new text memory 17 of the facsimile apparatus.

Figure 14:
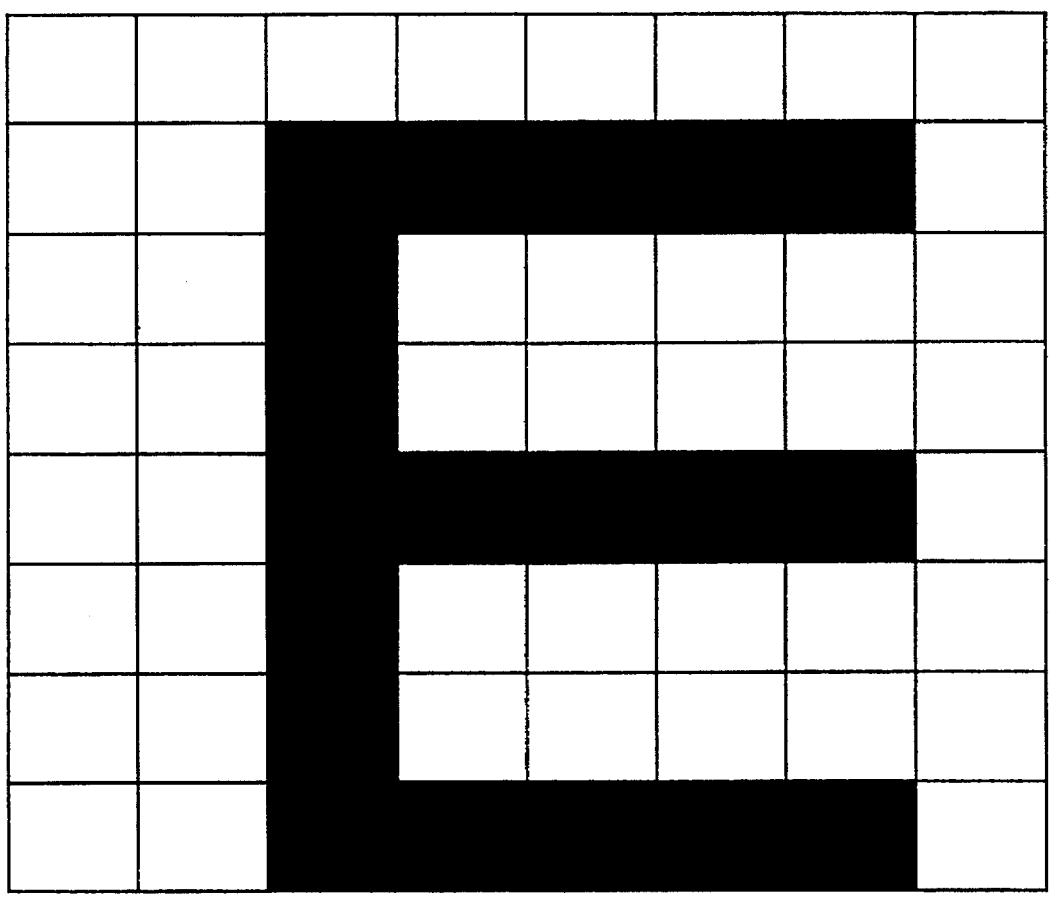
FIG. 14 is a view showing a character image which is displayed on a display part of the facsimile apparatus by reading out a stored font pattern.

FIG. 14 shows a character image which is displayed on the display part 9 of the facsimile apparatus in FIG. 10 by reading a stored font pattern data from the new text memory 17. Similarly to the facsimile apparatus in FIG. 1, the display part 9 is made up of liquid crystal display units each having 64 segments arranged in an 8×8 matrix formation. As the mark sheet shown in FIG. 13 is read by the document reader 5 to register the twelve font patterns of upper-case English characters "ERROR REPORT", a character image "E" shown in FIG. 14 is, for example, displayed by reading one of the stored font pattern data from the new text memory 17.

FIG. 15 shows an example of bit pattern data stored in the new text memory 17 of the facsimile apparatus in FIG. 10. Similarly to FIG. 6, the storage address of the new text memory 17 starts with "8000". The input font pattern data read by the document reader 5 from the mark sheet is converted by the data transforming part 10 into bit pattern data, and such data is stored in the new text memory 17 at a determined storage address.

Next, the font pattern data input process performed by the facsimile apparatus of the third embodiment will be described. As shown in FIG. 15, 8-bit data "b0" through "b7" (one byte) is stored at each storage address of the new text memory 17. A first 16-bit data at addresses "8000" and "8001" in FIG. 15 is a directory data indicating the presence of each of 16 combinations of characters (16 words) indicated by the input font patterns stored in the new text memory 17. In FIG. 15, a bit pattern data (corresponding to a font pattern data read by the document reader 5 and converted by the data transforming part 10) is stored in an 8-byte area of the new text memory 17 at addresses "8002" through "8009". The bit "b0" at the address "8000" in the directory data indicates whether or not twelve font patterns read from the mark sheet are stored in twelve 8-byte areas of the new text memory 17 starting with the address "8002". As shown in FIG. 15, the bit "b0" at the address "8000" is equal to "1", which indicates that twelve font patterns are stored. In the bit pattern data in FIG. 15, font pattern data representing only the first three characters of upper-case English characters "ERROR REPORT" is indicated.

When no corresponding font patterns of text data to be dusplayed are stored in the new text memory 17, the previously installed font pattern data is read by the system control part 7 from the fixed text memory 11 of the facsimile apparatus in FIG. 10, and then the text data represented by such font pattern data is displayed.

In order to display text data represented by font patterns stored in the new text memory 17, the operator selects the new text memory 17 out of the two memory parts 11 and 17, and inputs text data display instructions from the key input part 8. When such a request is made, the system control part 7 reads the font pattern data from the new text memory 17, and displays the text data represented by the font pattern data on the display part 9.

In addition, the system control part 7 carries out a font pattern checking procedure and a font pattern deleting procedure in terms of a set of twelve font patterns in accordance with the instructions supplied by the operator from the key input part 8. If font pattern checking instructions are input by the operator from the key input part 8, the system control part 7 reads the font patterns of concern from the new text memory 17, and displays the font pattern data on the display part 9. If font pattern deleting instructions are input by the operator from the key input part 8, the system control part 7 deletes the font pattern data of concern in the new text memory 17 (the EEPROM 73) by resetting a corresponding bit of the directory data to zero.

Next, a description will be given of a fourth embodiment of the facsimile apparatus according to the present invention with reference to FIGS. 16 and 17. This embodiment enables the font pattern data input procedure to be carried out by using a special-form bar-code sheet.

Figure 16:
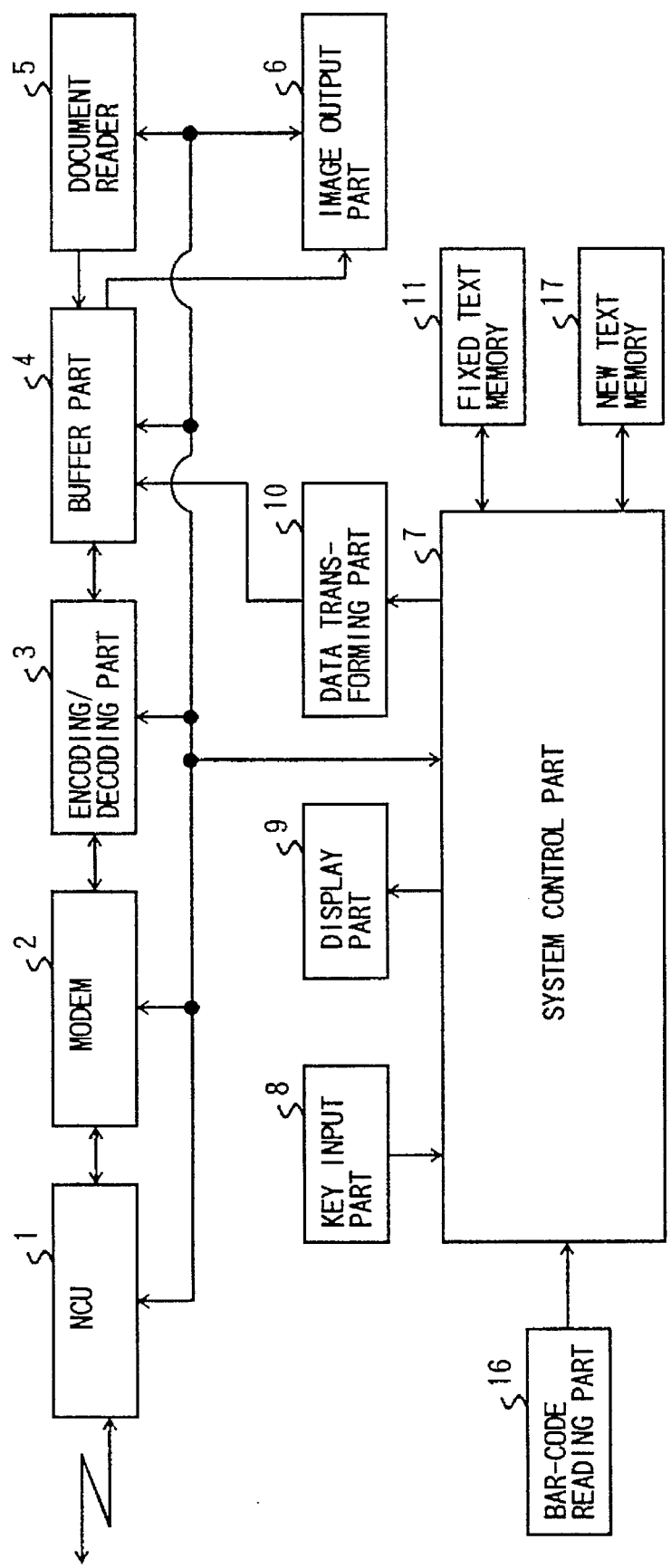
FIG. 16 is a block diagram showing a fourth embodiment of the facsimile apparatus according to the present invention.

FIG. 16 shows a facsimile apparatus provided in the fourth embodiment of the present invention. In FIG. 16, the parts which are the same as corresponding parts of the third embodiment shown in FIG. 10 are designated by the same reference numerals and a description thereof will be omitted. In the facsimile apparatus shown in FIG. 16, the bar-code reading part 16 is connected to the system control part 7, and the bar-code reading part 16 optically reads font pattern data from a special-form bar-code sheet. The font pattern data read by the bar-code reading part 16 comprises a plurality of bar codes which are indicated by combinations of bars having two different thicknesses. The operation of the facsimile apparatus in FIG. 16 relating to the reading and storing of the input font pattern data is similar to the operation of the facsimile apparatus in FIG. 1.

Figure 17:
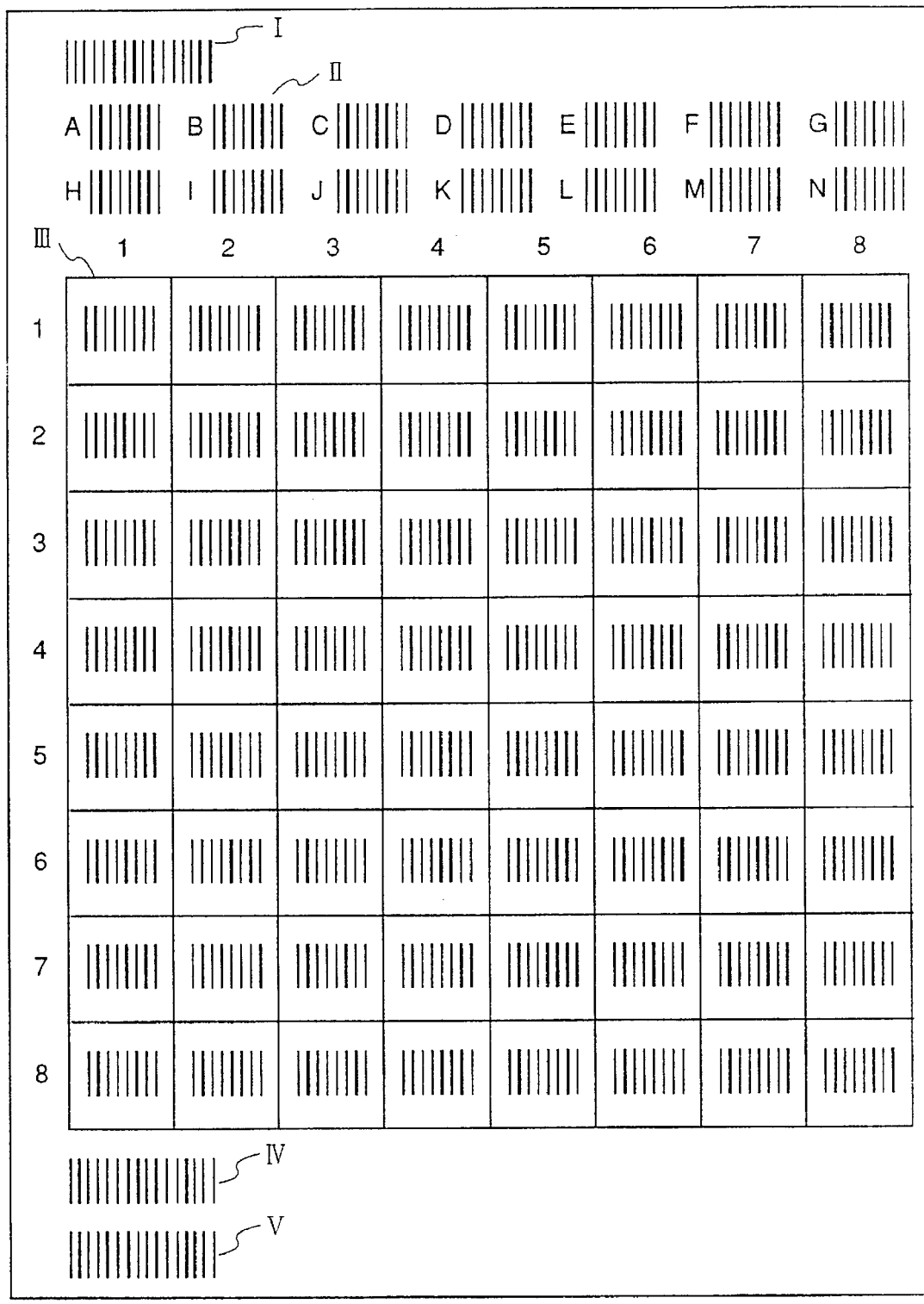
FIG. 17 is a view showing an example of a bar-code sheet used by the facsimile apparatus in FIG. 16.

FIG. 17 shows the form of the bar-code sheet used by the facsimile apparatus in FIG. 16. In FIG. 17, "I" denotes a read-start bar code used to detect a reading start position at which the reading of the input font pattern data (a new text) from the bar-code sheet is started. "II" denotes a text type bar code used to indicate the type of the input font pattern data (or the type of the new text). The text type bar code II comprises fourteen different bar codes "A" through "N", and these bar codes indicate different text types.

In the bar-code sheet form shown in FIG. 17, "III" denote separating lines by which 64 bar codes arranged in an 8×8 matrix formation are separated from each other so as to form 64 square segments, each bar code being indicated by combinations of thin and thick bars. Each of the 64 bar codes contains address data indicating a relative position of the bar code within the 64 segments. "IV" denotes a character-end bar code indicating an end position at which the reading of one of the input font patterns is finished. "V" denotes a text-end bar code indicating a read-end position at which the reading of the input font patterns (the new text) is finished. The text-end bar code V on the last sheet of a plurality of the bar-code sheets is detected.

Next, a description will be given of a fifth embodiment of the facsimile apparatus according to the present invention with reference to FIGS. 18 through 23. In the fifth embodiment, a set of new font patterns representing a facsimile sender data (corresponding to a combination of characters or text) is stored in a storage memory by using a special-form mark sheet, and the facsimile sender data is added to an image read by the document reader from a document before the image is transmitted via a telephone line, so that a transmitted document image printed by a receiving facsimile terminal comprises the facsimile sender data represented by the font pattern data.

Figure 18:
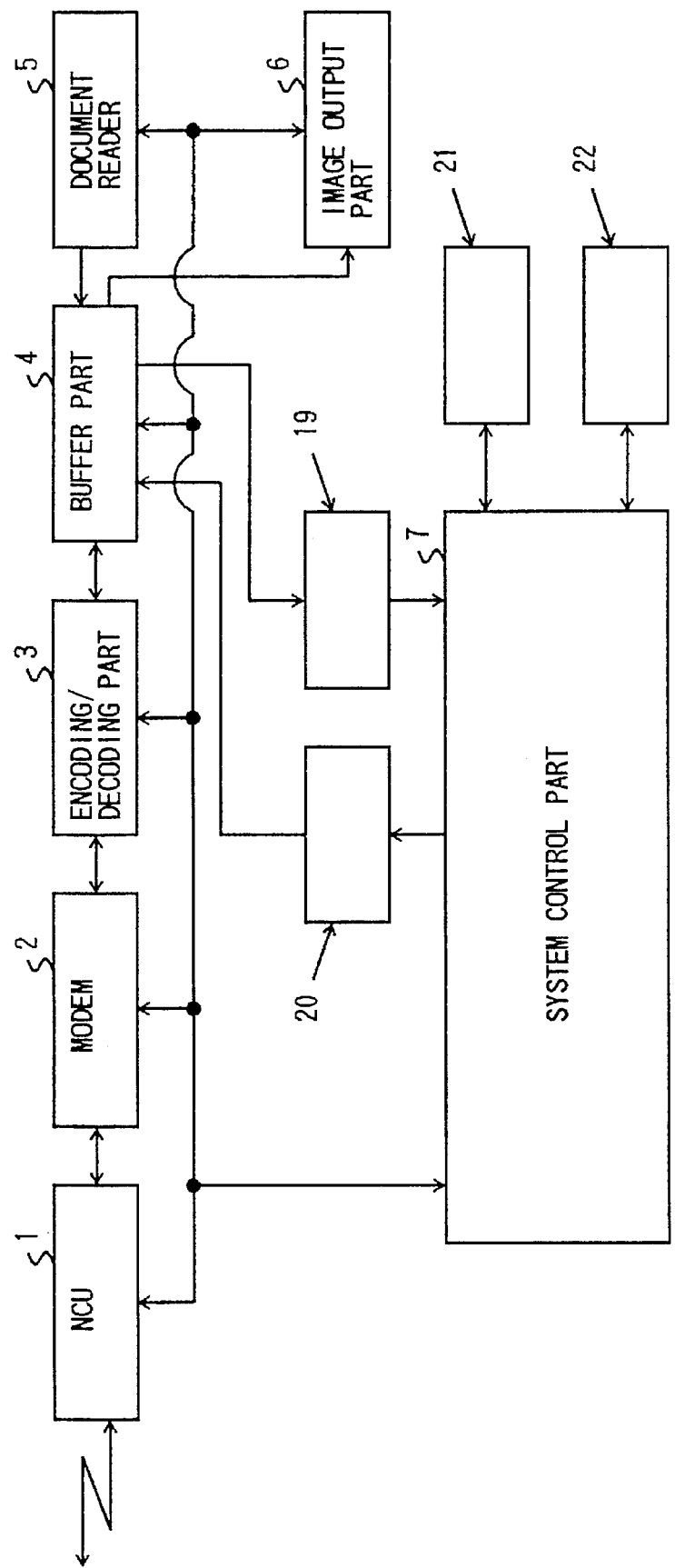
FIG. 18 is a block diagram showing a fifth embodiment of the facsimile apparatus according to the present invention.

FIG. 18 shows a facsimile apparatus provided in the fifth embodiment of the present invention. In FIG. 18, the parts which are the same as corresponding parts of the first embodiment in FIG. 1 are designated by the same reference numerals and a description thereof will be omitted. In the facsimile apparatus in FIG. 18, there are provided a data generating part 19, a data transforming part 20, a sender data memory 21 and a data position memory 22 which are connected to the system control part 7. The input font pattern data is read by the document reader 5 from the mark sheet and such pattern data is temporarily stored in the buffer part 4. In addition, the position at which the font pattern data should be added to a facsimile transmission image is read by the document reader 5 from the mark sheet and such position data is temporarily stored in the buffer part 4. When the type of the mark sheet is detected, the system control part 7 allows the data generating part 19 to convert the font pattern data read from the buffer part 4 into bi-level output data so that such output data is stored in the sender data memory 21. In addition, the system control part 7 allows the data generating part 19 to store the position data read from the buffer part 4 in the data position memory 22.

In the facsimile apparatus shown in FIG. 18, the data transforming part 20 converts the font pattern data read from the sender data memory 21 into a facsimile transmission data or an output image data, and supplies the produced data to the buffer part 4 so that the produced data is added to an image to be transmitted at the position indicated by the position data read from the data position memory 22.

Figure 19:
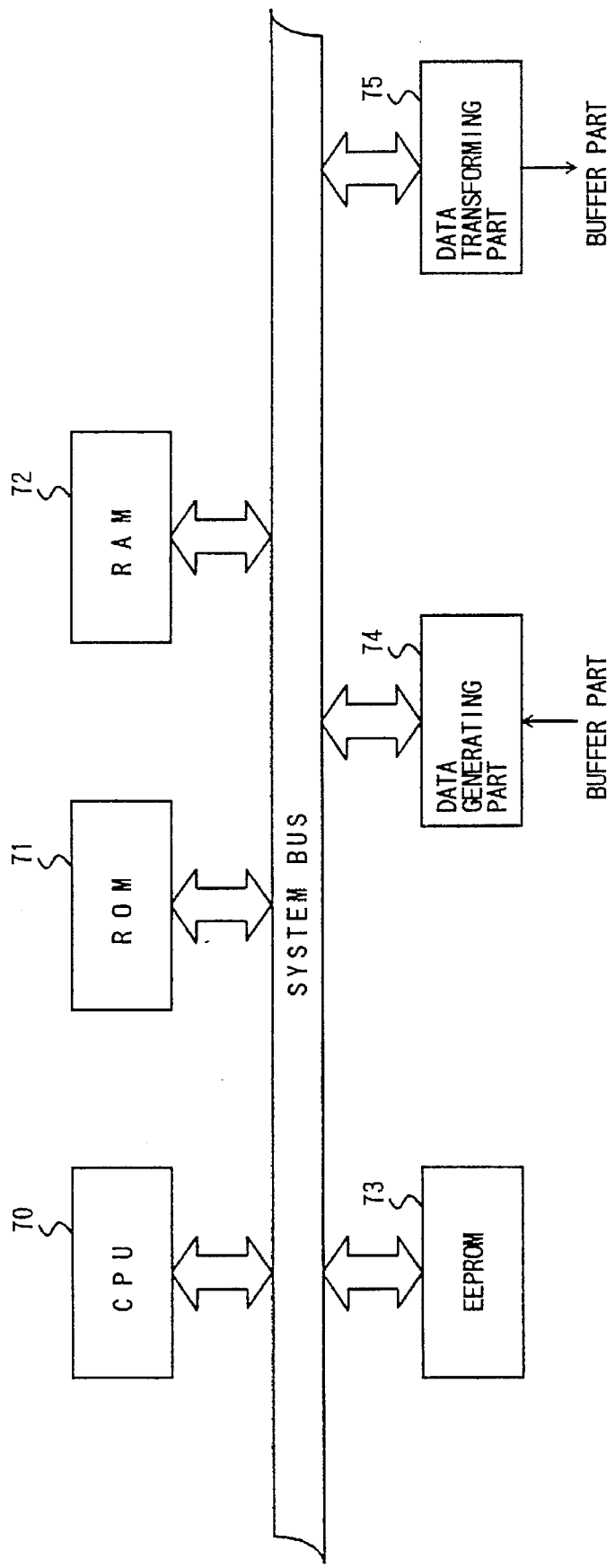
FIG. 19 is a block diagram showing a facsimile system to which the present invention is applied.

FIG. 19 shows a facsimile system to which the present invention is applied. The facsimile system shown in FIG. 19 comprises the CPU 70, the ROM 71, the RAM 72, the EEPROM 73, a data generating part 74, and a data transforming part 75, and these component units 70–75 are interconnected by a system bus. The data generating part 74 and the data transforming part 75 in FIG. 19 correspond to the data generating part 19 and the data transforming part 20 in FIG. 18, respectively. The sender data memory 21 and the data address memory 22 shown in FIG. 18 are formed with the EEPROM 73 in FIG. 19.

Figure 20:
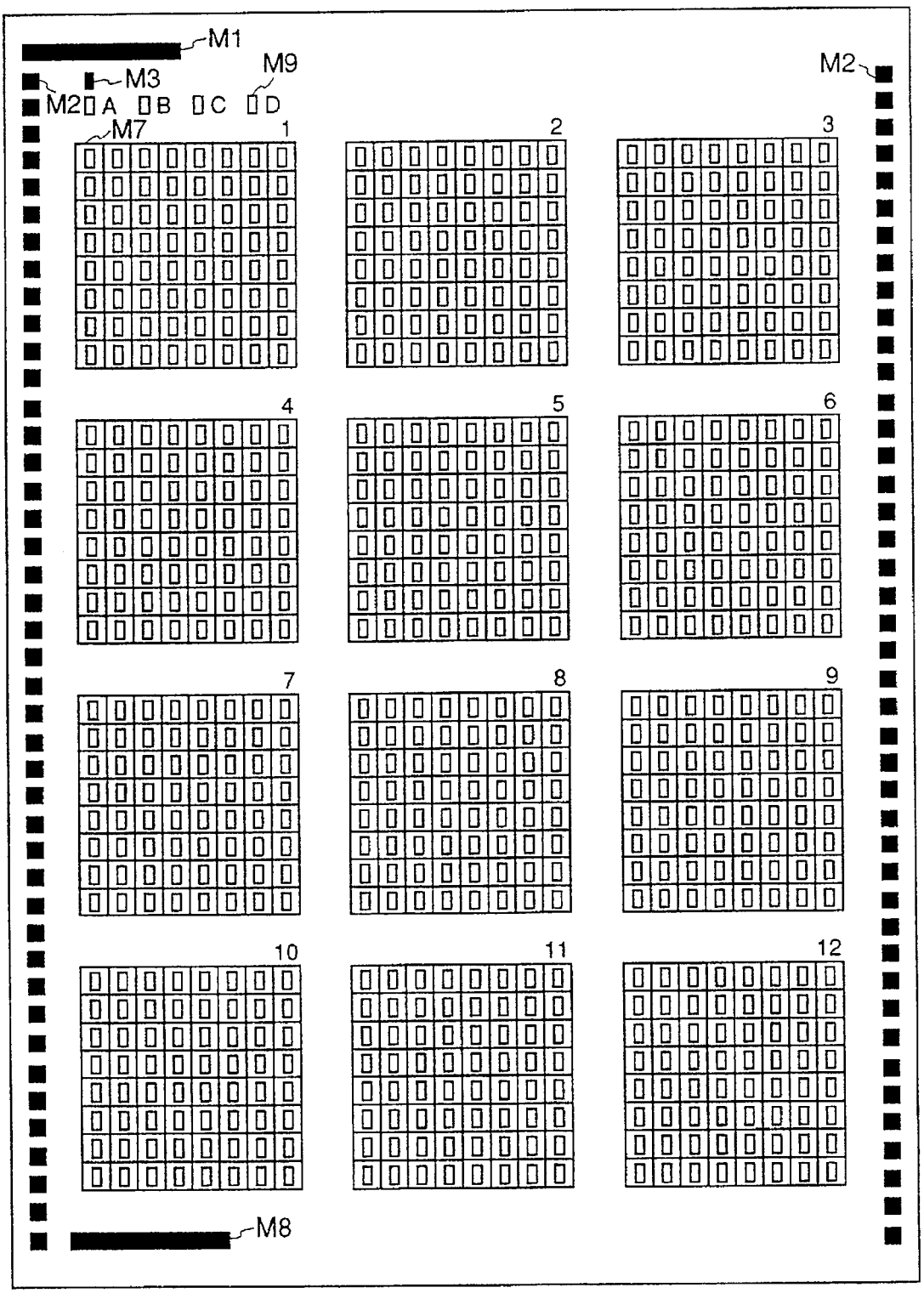
FIG. 20 is a view showing a form of a mark sheet used by the facsimile apparatus shown in FIG. 18.

FIG. 20 shows the form of a mark sheet used by the facsimile apparatus in FIG. 18. This special-form mark sheet in FIG. 20 which is similar to the mark sheet shown in FIG. 11 is read by the document reader 5 in FIG. 18 so as to store at a time a plurality of new font patterns representing a facsimile sender data in a storage memory. As shown in FIG. 20, the mark sheet includes twelve input font pattern data, each font pattern data is formed with a plurality of dots arranged in an 8×8 dot matrix formation, each dot having a fixed size and being smudged in black or remaining unchanged as white dot.

In the mark sheet form shown in FIG. 20, M3 denotes a sheet type mark (smudged in black and located at a prescribed position with respect to the width direction of the mark sheet) used to indicate that the mark sheet is of the type for inputting a plurality of new font patterns representing a facsimile sender data. M9 denotes a data position mark used to indicate the position at which the facsimile sender data of the input font patterns is added to a facsimile transmission image. The data position mark M9 shown in FIG. 20 comprises four marks "A" through "D" which are used to indicate, for example, one of four corner positions of the facsimile transmission image.

In the mark sheet form shown in FIG. 20, M7 denotes the twelve input font patterns (the facsimile sender data), and each input font pattern (representing one character) is formed with 64 dots arranged in an 8×8 matrix formation, and each dot being smudged in black or remaining unchanged as white dot. A combination of characters is formed with the twelve input font patterns. When an input font pattern in which all the 64 dots remain unchanged as white dots indicates a blank or an empty space. The others relating to the mark sheet form in FIG. 20 are essentially the same as corresponding features of the mark sheet in FIG. 11.

Figure 21:
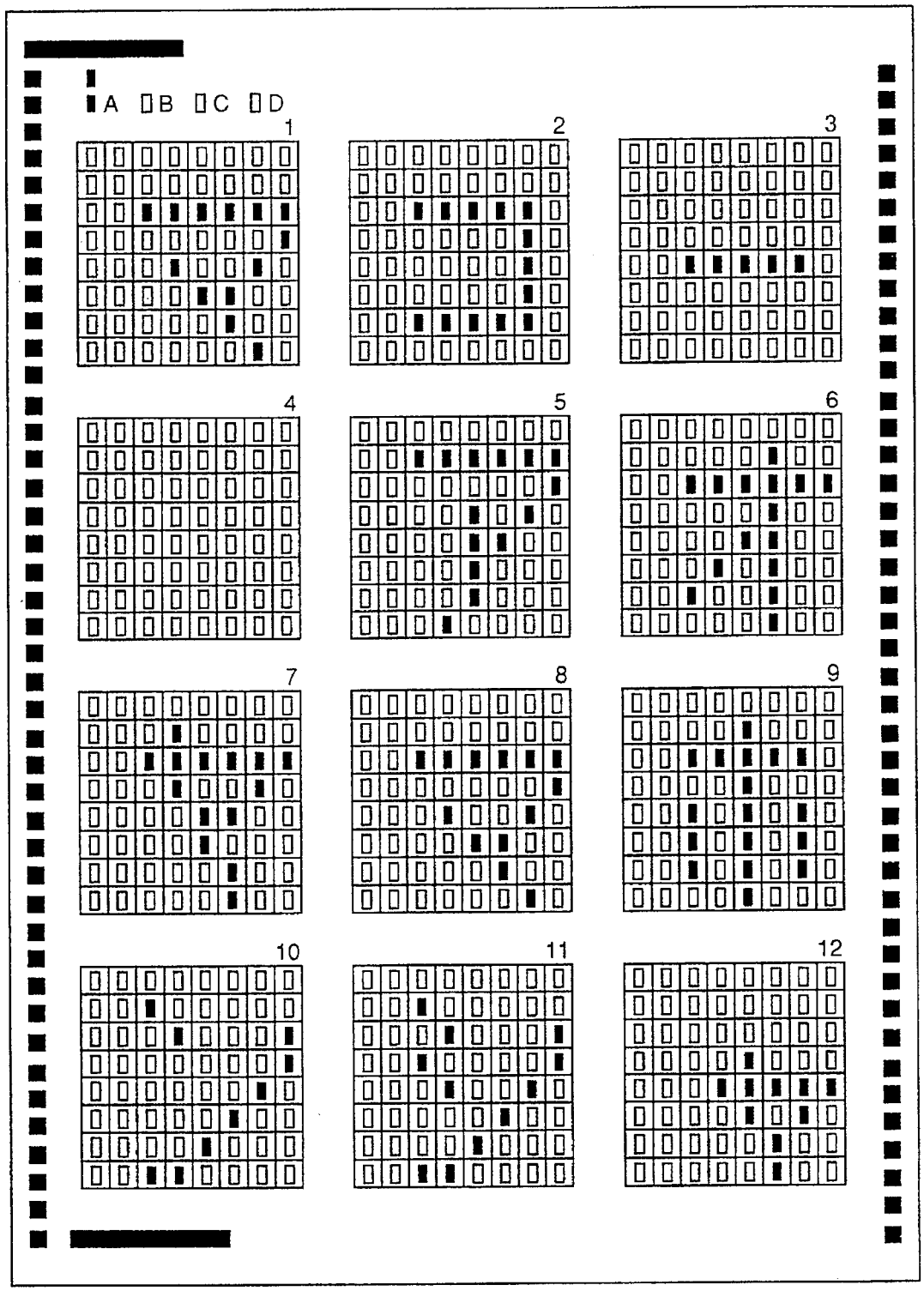
FIG. 21 is a view showing an example of a filled-in mark sheet which is read by the facsimile apparatus shown in FIG. 18.

FIG. 21 shows an example of a filled-in mark sheet which is used to register input font patterns representing a facsimile sender data in the facsimile apparatus. The mark sheet shown in FIG. 21 is used to store the input font patterns of Japanese Katakana letters "MAKOH AOYAMAHONSHA" in the sender data memory 21 in FIG. 18.

FIG. 22 shows an example of bit pattern data stored in the sender data memory 21 of the facsimile apparatus in FIG. 18. The input font pattern data read by the document reader 5 from the mark sheet is converted by the data generating part 19 into bit pattern data, and such data is stored in the sender data memory 21. In the bit pattern data shown in FIG. 22, a first 16-bit data at addresses "8000" and "8001" is a directory data relating to the input font patterns stored in the sender data memory 21. Of this directory data, the 8-bit data at address "8000" indicates the presence of each of eight combinations of characters of the input font pattern data stored in the sender data memory 21, and the 8-bit data at address "8001" indicates the position of the facsimile sender data. For example, the bits "b0" through "b3" at address "8001" of the bit pattern data in FIG. 22 correspond to the densities of the marks "A" through "D" of the position mark M9 in FIG. 20, respectively. For example, as the position mark "A" is smudged in black in the mark sheet in FIG. 21, the bit "b0" at address "8001" of the bit pattern data in FIG. 22 is equal to 1, which indicates that the font pattern data should be added to a facsimile transmission image at the top-left corner position.

Figure 23:
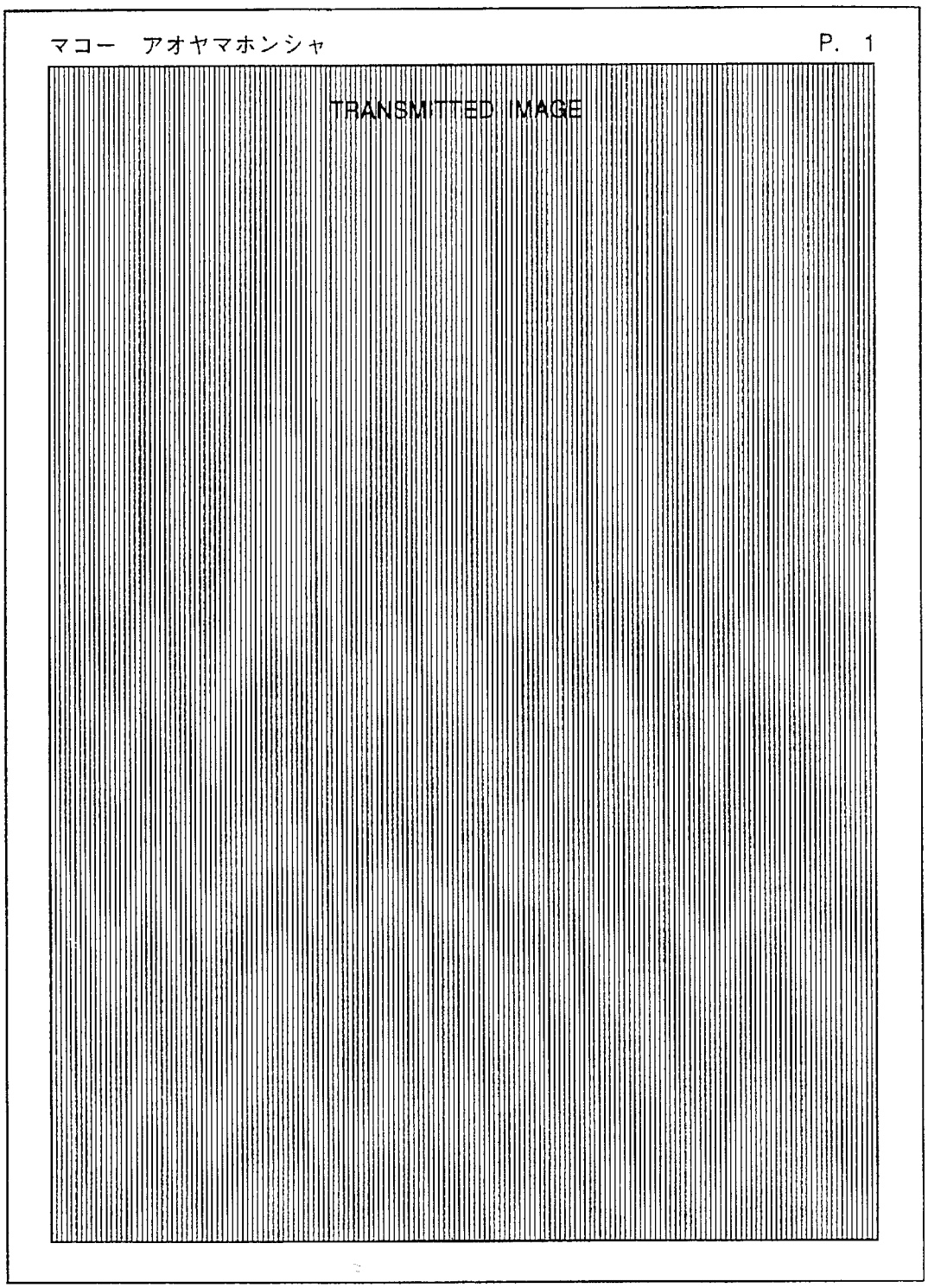
FIG. 23 is a view showing an image which is transmitted from the facsimile apparatus in FIG. 18 and printed by a receiving facsimile terminal.

FIG. 23 shows an image which is transmitted from the facsimile apparatus in FIG. 18 and printed by a receiving facsimile terminal. As shown in FIG. 23, this image comprises a facsimile sender data represented by the font pattern data stored in the sender data memory 21.

Further, the present invention is not limited to the above described embodiments, and variations and modifications may be made without departing from the scope of the present invention.

What is claimed is:

1. A facsimile apparatus comprising:
    reading means for optically reading font pattern data by raster scanning a font pattern sheet on which a desired font pattern is marked by an operator, said font pattern data optically read by said reading means comprising a plurality of dots arrayed in rows and columns in a two-dimensional matrix formation, each of said dots of said font pattern data being marked in either one of two optically different densities;
    communication means for receiving image data from an external facsimile terminal via a telephone line, and for transmitting image data read from a document to an external facsimile terminal via said telephone line;
    memory means for temporarily storing the image data received or transmitted by said communication means;
    printing means for printing an image on a recording sheet in accordance with said image data stored in said memory means;
    converting means, coupled to said reading means and to said memory means, for converting said font pattern data from said reading means into font data, said font data indicating said desired font pattern of said font pattern sheet, and for supplying said font data to said memory means;
    storage means for storing said font data produced by said converting means; and
    control means for reading said font data from said storage means, and for allowing said printing means to print an image in accordance with said image data stored in said memory means by using the read font data, so that said printed image comprises data represented by said desired font pattern marked by the operator.

2. A facsimile apparatus according to claim 1, wherein said reading means optically reads image data by raster scanning a document at a prescribed resolution, said image data comprising a plurality of dots arranged in a two-dimensional matrix formation, each dot being indicated by one of two optically different densities.

3. A facsimile apparatus according to claim 1, further comprising bar-code reading means for optically reading font pattern data from a bar-code sheet, said font pattern data comprising a plurality of bar codes which are indicated by combinations of bars having two different thicknesses.

4. A facsimile apparatus according to claim 1, further comprising input means for inputting one of a plurality of types of instructions to said control means, whereby said control means reads said font data from said storage means when font pattern reading instructions are input to said control means.

5. A facsimile apparatus according to claim 4, wherein said storage means stores a plurality of sets of font data produced by said converting means, said plurality of sets of font data corresponding to a plurality of sets of font pattern data read by said reading means, and each set of font pattern data representing a combination of characters.

6. A facsimile apparatus according to claim 5, wherein said plurality of sets of font data stored in said storage means are facsimile sender data identifying a sender of said facsimile apparatus.

7. A facsimile apparatus according to claim 1, wherein said control means allows said font data of said storage means to be added to image data stored in said memory means so that an image relating to image data transmitted by said communication means and comprising data represented by said font data is printed by said printing means.

8. A facsimile apparatus according to claim 1, further comprising input means for inputting one of a plurality of types of instructions to said control means, and display means for displaying an image relating to an operational report in accordance with instructions input from said input means,
    whereby said control means allows said font data of said storage means to be added to image data stored in said memory means so that an image relating to the operational report and comprising data represented by said font data is displayed by said display means.

9. A facsimile apparatus according to claim 1, wherein said control means detects whether said plurality of dots of said font pattern data read by said reading means are located within a predetermined area of said font pattern sheet, so that said control means allows said font data of said converting means to be stored in said storage means when said dots are located within said predetermined area.

10. A facsimile apparatus according to claim 1, wherein said reading means reads said font pattern data by raster scanning said font pattern sheet after a mark at a prescribed location of said font pattern sheet is detected.

11. A facsimile apparatus according to claim 1, wherein when an image is received by said communication means from an external facsimile terminal capable of producing said font data indicating font pattern data read from a font pattern sheet, said control means allows the received image data of said memory means to be stored in said storage means.

12. A facsimile apparatus comprising:
    reading means for optically reading image data by raster scanning a document, and for optically reading font pattern data by raster scanning a font pattern sheet on which a desired font pattern is marked by an operator, said font pattern data optically read by said reading means comprising a plurality of dots arrayed in rows and columns in a two-dimensional matrix formation, each of said dots of said font pattern data being marked in either one of two optically different densities;

detection means for detecting whether the document or the font pattern sheet is read by said reading means;

converting means, coupled to said reading means, for converting the font pattern data from said reading means into font data, said font data indicating said desired font pattern marked by the operator;

storage means for storing font data produced by said converting means; and control means, coupled to said detection means, for allowing said font data from said converting means to be stored in said storage means when said detection means has detected that the font pattern sheet is read by said reading means, said stored font data of said storage means thus comprising data represented by said desired font pattern marked by the operator.

13. A facsimile apparatus comprising:

reading means for optically reading image data by raster scanning a document, and for optically reading font pattern data by raster scanning a font pattern sheet on which a desired font pattern is marked by an operator, said font pattern data optically read by said reading means comprising a plurality of dots arrayed in rows and columns in a two-dimensional matrix formation, each of said dots of said font pattern data being marked in either one of two optically different densities, wherein said font pattern sheet including a sheet type mark marked by the operator;

detection means for detecting whether said reading means has read a document or a font pattern sheet depending on whether said sheet type mark of said font pattern sheet is read or not;

converting means, coupled to said reading means, for converting the font pattern data from said reading means into font data, said font data indicating said desired font pattern marked by the operator;

storage means for storing font data produced by said converting means; and control means, coupled to said detection means, for allowing said font data from said converting means to be stored in said storage means when said detection means has detected that said sheet type mark of said font pattern sheet is read by said reading means, said stored font data of said storage means thus comprising data represented by said desired font pattern marked by the operator.

\* \* \* \* \*